(12) United States Patent
Dworkin et al.

(10) Patent No.: US 7,904,345 B2
(45) Date of Patent: Mar. 8, 2011

(54) PROVIDING WEBSITE HOSTING OVERAGE PROTECTION BY TRANSFERENCE TO AN OVERFLOW SERVER

(75) Inventors: Benjamin Dworkin, Scottsdale, AZ (US); Jonathan Furrer, Phoenix, AZ (US); Joseph Miller, Chandler, AZ (US); Kevin Scheer, Phoenix, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 196 days.

(21) Appl. No.: 12/136,659

(22) Filed: Jun. 10, 2008

(65) Prior Publication Data

US 2008/0243634 A1 Oct. 2, 2008

(51) Int. Cl.
*G06Q 30/00* (2006.01)
(52) U.S. Cl. ............... 705/26; 705/1; 709/219; 709/224; 726/25; 726/11
(58) Field of Classification Search .............. 705/26, 705/1; 709/219, 224; 726/25, 11, 2
See application file for complete search history.

(56) References Cited

U.S. PATENT DOCUMENTS

| | | | |
|---|---|---|---|
| 6,654,804 B1 | 11/2003 | Fleming | |
| 6,789,103 B1 | 9/2004 | Kim et al. | |
| 6,842,769 B1 | 1/2005 | Kim et al. | |
| 6,868,444 B1 | 3/2005 | Kim et al. | |
| 6,993,572 B2* | 1/2006 | Ross et al. | 709/218 |
| 7,620,725 B2* | 11/2009 | King et al. | 709/229 |
| 2005/0080899 A1 | 4/2005 | Vogel et al. | |
| 2005/0114541 A1 | 5/2005 | Ghetie et al. | |
| 2006/0047965 A1 | 3/2006 | Thayer et al. | |
| 2006/0184640 A1* | 8/2006 | Hatch | 709/217 |
| 2007/0198724 A1 | 8/2007 | Hawkinson et al. | |
| 2007/0260702 A1* | 11/2007 | Richardson et al. | 709/217 |
| 2007/0261112 A1* | 11/2007 | Todd et al. | 726/11 |
| 2007/0283005 A1 | 12/2007 | Beliles et al. | |
| 2008/0256553 A1 | 10/2008 | Cullen | |
| 2009/0042537 A1 | 2/2009 | Gelbman et al. | |
| 2009/0055506 A1 | 2/2009 | Hudson et al. | |
| 2009/0300407 A1 | 12/2009 | Kamath et al. | |
| 2010/0042927 A1* | 2/2010 | Kim | 715/735 |

OTHER PUBLICATIONS

Oct. 27, 2010 non-final rejection in related U.S. Appl. No. 12/136,677.
Applicant's Nov. 22, 2010 reply to Oct. 27, 2010 non-final rejection in related U.S. Appl. No. 12/136,677.
Jun. 7, 2010 non-final rejection in related U.S. Appl. No. 12/136,677.
Applicant's Aug. 16, 2010 reply to Jun. 7, 2010 non-final rejection in related U.S. Appl. No. 12/136,677.
Braden, RFC 1123, Requirements for Internet Hosts—Application and Support, Oct. 1989.

(Continued)

*Primary Examiner* — Vanel Frenel
(74) *Attorney, Agent, or Firm* — Karl A. Fazio

(57) ABSTRACT

Systems and methods of the present inventions allow for providing website hosting overage protection. An exemplary method may comprise the steps of hosting a website on a first server, monitoring a website usage parameter, transferring the website to an overflow server when the website usage parameter exceeds a first predetermined value, and redirecting a plurality of traffic to the overflow server. The website transfer may be accomplished by generating a copy of the website and installing the copy on the overflow server. The website may be retained on the first server. When the website usage parameter falls below a second predetermined value, traffic may be redirected back to the first server.

35 Claims, 20 Drawing Sheets

OTHER PUBLICATIONS

Unpublished U.S. Appl. No. 11/708,737.
Unpublished U.S. Appl. No. 11/708,736.
Unpublished U.S. Appl. No. 11/708,729.
Unpublished U.S. Appl. No. 11/708,976.
Unpublished U.S. Appl. No. 12/029,062.

* cited by examiner

PROVIDING WEBSITE HOSTING OVERAGE PROTECTION BY TRANSFERENCE TO AN OVERFLOW SERVER

CROSS REFERENCE TO RELATED PATENT APPLICATIONS

This patent application is related to U.S. patent application Ser. No. 12/136,677 entitled: "PROVIDING WEBSITE HOSTING OVERAGE PROTECTION BY STORAGE ON AN INDEPENDENT DATA SERVER" concurrently filed herewith and also assigned to The Go Daddy Group, Inc.

FIELD OF THE INVENTION

The present inventions generally relate to the field of Internet website hosting and, more specifically, systems and methods for providing website hosting overage protection.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Hosting providers often sell website hosting services based upon the content provider's anticipated memory and bandwidth needs. For example, a content provider may pay a lower monthly fee for 100 gigabytes (GB) of server disk space and 1000 GB of bandwidth than another content provider whose website may require 500 GB and 5000 GB of server disk space and bandwidth, respectively. Content providers must carefully evaluate their website's anticipated storage and bandwidth needs and select their hosting plan accordingly. If they underestimate their needs, their website may become non-functional once their memory and/or bandwidth allotment is exceeded.

Even a carefully-executed website load analysis, however, can greatly underestimate website traffic (and therefore CPU and/or bandwidth usage) if the website becomes unexpectedly popular amongst Internet users, or perhaps becomes the subject of a "denial-of-service attack" (a potentially-malicious attempt to make a computer resource unavailable to its intended users). Such unexpected traffic spikes have become increasingly common due to the recent proliferation of community-driven content aggregation and bookmarking online services, such as www.digg.com, www.del.icio.us, and www.reddit.com.

With such aggregation services, news stories and/or other online content are submitted by users, and then promoted to the service's front webpage through a user-based ranking system along with links to the original website. Thus, if a website catches the attention of Internet users and gets linked to such an aggregation service, traffic (and therefore bandwidth load) may suddenly spike and exceed the website's memory and/or bandwidth allotment. If the website is hosted on a "full" server (i.e., the server's memory and bandwidth are already allocated to other demands), the website may become non-functional. Furthermore, due to the nature of shared hosting (e.g., multiple websites hosted on the same server), a website generating a large amount of traffic may hinder the performance of other's websites hosted on the same server.

Applicant has noticed that presently-existing systems and methods do not provide website hosting customers with adequate protection against the risks associated with such unexpected website traffic. For the foregoing reasons, there is a need for the systems and methods for providing website hosting overage protection and related functionality as described herein.

SUMMARY OF THE INVENTION

The limitations cited above and others are substantially overcome through the systems and methods disclosed herein, which allow for providing website hosting overage protection.

In an example embodiment of a system for providing website hosting overage protection, a first server (hosting a website) may be configured to automatically transfer the website—and redirect traffic—to an overflow server (which may comprise a single server or a clustered hosting solution) when a website usage parameter exceeds a first predetermined value. Conversely, the overflow server may be configured to automatically transfer the website—and redirect traffic—back to the first server when the website usage parameter falls below a second predetermined value. A network may communicatively couple the first server, the overflow server, and a plurality of users.

An exemplary method for providing website hosting overage protection may comprise the steps of hosting a website on a first server, monitoring a website usage parameter, transferring the website to an overflow server when the website usage parameter exceeds a first predetermined value, and redirecting a plurality of traffic to the overflow server. The website transfer may be accomplished by generating a copy of the website and installing the copy on the overflow server. The website may be retained on the first server. When the website usage parameter falls below a second predetermined value, traffic may be redirected back to the first server.

The above features and advantages of the present inventions will be better understood from the following detailed description taken in conjunction with the accompanying drawings.

DETAILED DESCRIPTION

Figure 1:
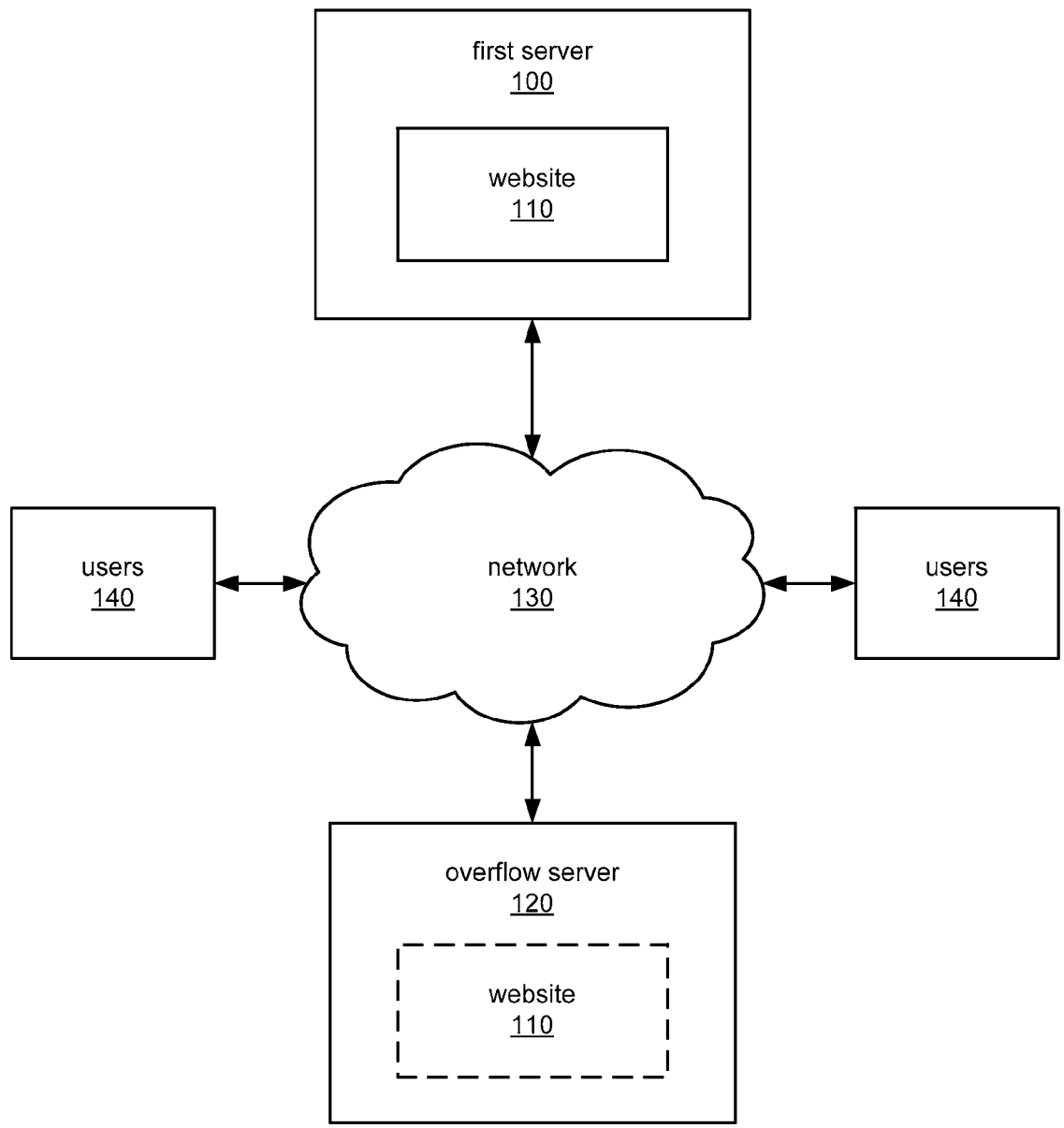
FIG. 1 illustrates a possible embodiment of a system for providing website hosting overage protection.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

Transferring the Website to an Overflow Server

A streamlined example embodiment of a system for providing website hosting overage protection is illustrated in FIG. 1. The illustrated embodiment includes a first server 100 hosting a website 110. The first server 100 may be configured to automatically transfer the website 110 to an overflow server 120 and redirect a plurality of traffic to the overflow server 120 when a website usage parameter exceeds a first predetermined value. The system also may include a network 130 communicatively coupling the first server 100, the overflow server 120, and a plurality of users 140. Users 140 of this system may comprise any individual or entity including, but not limited to, a person, a business, a governmental institution, an educational institution, a non-profit organization, or a social organization.

The example embodiments herein place no limitation on network 130 configuration or connectivity. Thus, as non-limiting examples, the network 130 could comprise the Internet, the public switched telephone network, the global Telex network, computer networks (e.g., an intranet, an extranet, a local-area network, or a wide-area network), wired networks, wireless networks, or any combination thereof.

The first server 100, the overflow server 120, and the plurality of users 140 may be communicatively coupled to the network 130 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (Ti, Frame Relay), Point-to-Point Protocol over Ethernet (PPPoE), and/or any combination thereof.

The first server 100, the overflow server 120, and/or any other server described herein, could be any computer or program that provides services to other computers, programs, or users either in the same computer or over a computer network. As non-limiting examples, the first server 100 and/or the overflow server 120 could be an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

With a shared hosting server, many websites may reside on a single server. Each website may be stored in its own partition (i.e., section or place) on the server to keep it separate from other websites. Shared hosting servers are the most economical hosting option because numerous hosting customers may share in server maintenance cost. Virtual dedicated servers also may comprise a single server, but one that is partitioned into multiple (virtual) servers, each of which may have the appearance to the end user of being the users' own dedicated server. Such virtual dedicated servers may run their own operating system and be independently rebooted. Dedicated servers generally represent the most expensive website hosting option. With dedicated server hosting, the hosting customer may lease a complete server that is dedicated to that customer (i.e., not shared with others). This model may be more flexible than shared or virtual-dedicated hosting because customers may be provided complete control over the server, including the ability to customize its hardware, software, and/or operating system.

The website 110 hosted on the first server 100 may comprise any collection of data and/or files accessible via a browser on a client having access to the network 130. Examples of clients that may be used include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. As non-limiting examples, the website 110 may comprise a single webpage or multiple interconnected and related webpages, each of which may provide access to multimedia content (e.g., text files, audio files, video files, graphics files, executable files, etc.).

As stated above, the first server 100 may be configured to automatically transfer the website 110 to an overflow server 120 and redirect a plurality of traffic to the overflow server 120 when a website usage parameter exceeds a first predetermined value. The website usage parameter may comprise any variable indicating the comparative use of the website. As non-limiting examples, the website usage parameter may comprise a measurement of website hits, central processing unit cycles, bandwidth utilization, disk utilization, number of connections, and/or any combination thereof. The first predetermined value may comprise any value for the website usage parameter, perhaps one that indicates a potential spike in website traffic.

Website hits are a measurement of the number of times the website 110 is visited by users 140. A website hit may comprise a request for a file made by a user's 140 browser. Every time a webpage on the website 110 is viewed, a user's 140 browser requests files from the first server 100. Server connections are a count of connections made to a server. A record of the website's 110 received hits and/or server connections are automatically created and saved in a "server log," which may comprise a log file that may be automatically generated and stored by the first server 100 of its activity. The server log may store a history of webpage requests and information about each request, such as client IP address, request date and time, page requested, HTTP code, etc. The website usage parameter may comprise either cumulative website hits or website hits per a period of time (e.g., website hits per hour).

Alternatively, the website usage parameter may comprise a measurement of the first server's 100 central processing unit (CPU) cycles consumed by traffic to the website 110. A CPU cycle refers to a single pulse of a server's CPU clock. For example, a 5 Mhz CPU will generate 5 million CPU cycles per second. In a shared—or virtual-dedicated—hosting environment, each website hosted on the first server 100 competes against other websites for these finite CPU cycles. The CPU cycles consumed by the website 110 may be measured and monitored by the first server's 100 operating system. Alternatively, it may be monitored and/or measured by proprietary or third-party, and/or open-source software installed on the first server 100, such as PRTG TRAFFIC GRAPHER by the PAESSLER Corporation and/or any of the many other available software-enabled CPU usage monitors.

Disk utilization may comprise a measurement of a server's disk capacity, disk allocation, and/or usage of disk space. Disk utilization may be measured and monitored by the first server's 100 operating system. Alternatively, it may be monitored and/or measured by proprietary, third-party, and/or open-source software installed on the first server 100, such as S.M.A.R.T. DISK MONITOR by the SOFTPEDIA Corporation and/or any of the many other available software-enabled disk utilization monitors.

The website usage parameter also may comprise a bandwidth value. As used herein, the term "bandwidth" refers to the volume of data (often measured in gigabytes (GB)) transferred to or from a server during a prescribed period of time. Bandwidth consumed by the website 110 may readily be measured by proprietary and/or third-party software installed on the first server 100, such as NETFLOW ANALYZER by the MANAGE ENGINE Corporation, BANDWIDTH MONITOR by BWMONITOR.COM, PRTG TRAFFIC GRAPHER by the PAESSLER Corporation, and/or any of the many other available software-enabled bandwidth usage monitors.

Irrespective of the website usage parameter used, the first server 100 may be configured to automatically transfer the website 110 and redirect a plurality of traffic to the overflow server 120 when the website usage parameter exceeds the first predetermined value. The first server 100 may be configured by installing software programmed with instructions stored on a computer-readable storage medium, the instructions which, when executed by the first server 100, cause it to generate a copy of the website 110, transfer the copy to the overflow server 120, and install the copy on the overflow server 120. Alternatively, scripts (a program or sequence of instructions that is interpreted or carried out by another program) may be written and implemented allowing the first server's 100 operating system to accomplish the copy, transfer, and install steps.

The copied website 110 (illustrated in the Figures as a dotted-line representation of the website 110) may be transferred to the overflow server 120 via any means of transferring data known in the art or developed in the future. Such methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to: (1) those used with TCP/IP (e.g., FTAM, FTP, HTTP, RCP, SFTP, SCP, or FASTCopy); (2) those used with UDP (e.g., TFTP, FSP, UFTP, or MFTP); (3) those used with direct modem connections; (4) HTTP streaming; (5) Tubular Data Stream Protocol (TDSP); (6) Stream Control Transmission Protocol (SCTP); and/or (7) Real Time Streaming Protocol (RTSP).

The installed software and/or scripts also may cause the first server 100 to redirect traffic to the overflow server 120 using any method and/or technology known in the art or developed in the future for redirecting traffic from one server to another including, but not limited to URL forwarding, redirecting, masking and/or any combination thereof. This may be accomplished by manual redirection, using HTTP 3xx status codes, server-side redirection scripting, .htaccess files, meta refresh redirection, JavaScript redirects, frame redirects, and/or redirect loops. Such redirection software and/or scripts may also update the DNS record for the website's 110 domain name to reflect the overflow server's 120 IP address.

In an alternate embodiment, the overflow server 120 may be configured (perhaps using the software and/or scripts described in detail above) to automatically transfer the website 110 and redirect traffic back to said first server 100 when the website usage parameter falls below a second predetermined value. The second predetermined value may comprise any value for the website usage parameter, perhaps one that indicates an end to a previous spike in website traffic.

Figure 2:
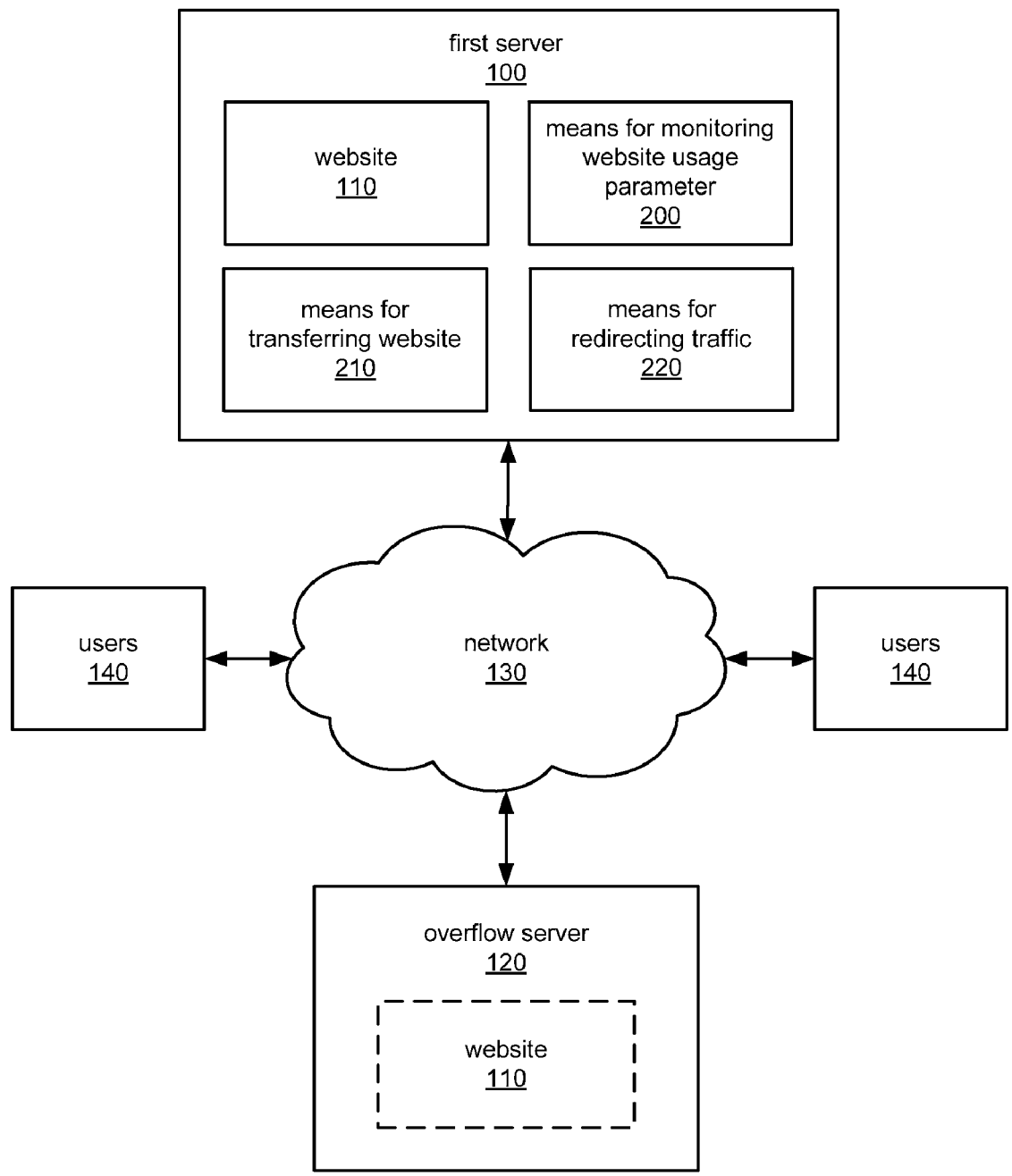
FIG. 2 illustrates a possible embodiment of a system for providing website hosting overage protection.

FIG. 2 illustrates an alternate embodiment of a system for providing website hosting overage protection, which comprises a first server 100 hosting a website 110, an overflow server 120, means for monitoring 200 a website usage parameter, means for automatically transferring 210 the website 110 to the overflow server 120 when the website usage parameter exceeds a first predetermined value, means for redirecting 220 a plurality of traffic from the first server 100 to the overflow server 120, and a network 130 communicatively coupling the first server 100, overflow server 120, means for monitoring 200, means for transferring 210, means for redirecting 220, and a plurality of users 140.

The means for monitoring 200, means for transferring 210, and means for redirecting 220 may comprise software programmed with instructions stored on a computer-readable storage medium, the instructions which, when executed—perhaps by the first server 100 or another server or computer—cause it to monitor a website usage parameter and, when the parameter is exceeded, generate a copy of the website 110, transfer the copy to the overflow server 120, and install the copy on the overflow server 120. Alternatively, scripts may be written and installed on the first server 100 causing its operating system to execute the monitoring, copying, transferring, and installing functions. Each of these means (200, 210, and/or 220) may reside in memory on the first server 100 or any other server or computer communicatively coupled to the first server 100 via the network 130.

As set forth in detail above, the website usage parameter may comprise a number of website hits, a number of central processing unit cycles, a bandwidth value, and/or any combination thereof. The means for monitoring 200 the website usage parameter may comprise any system or method known in the art or developed in the future for monitoring website usage. As a non-limiting example (where website hits are the monitored website usage parameter), the monitoring means may comprise the first server's 100 web server software. Website hits are a measurement of the number of times the website 110 is visited by users 140. A website hit may comprise a request for a file made by a user's 140 browser. Every time a webpage on the website 110 is viewed, a user's 140 browser requests files from the first server 100. A record of the website's 110 received hits are automatically created and saved in a "server log," which may comprise a log file that may be automatically generated and stored by the first server 100 of its activity. The server log may store a history of webpage requests and information about each request, such as client IP address, request date and time, page requested, HTTP code, etc. The website usage parameter may comprise either cumulative website hits or website hits per a period of time (e.g., website hits per hour).

In an example embodiment where the first server's 100 CPU cycles are used as a website usage parameter, the monitoring means may comprise the first server's 100 operating system. The CPU cycles consumed by the website 110 may be measured and monitored by the first server's 100 operating system. Alternatively, it may be monitored and/or measured by proprietary or third-party software installed on the first server 100, such as PRTG TRAFFIC GRAPHER by the PAESSLER Corporation and/or any of the many other available software-enabled CPU usage monitors.

In an example embodiment where bandwidth is used as a website usage parameter, bandwidth consumed by the website 110 may readily be measured by proprietary and/or third-party software installed on the first server 100, such as NETFLOW ANALYZER by the MANAGE ENGINE Corporation, BANDWIDTH MONITOR by BWMONITOR.COM, PRTG TRAFFIC GRAPHER by the PAESSLER Corporation, and/or any of the many other available software-enabled bandwidth usage monitors.

The means for transferring 210 the website from the first server 100 to the overflow server 120 may comprise software programmed with instructions stored on a computer-readable storage medium, the instructions which, when executed by the first server 100, cause it to generate a copy of the website 110, transfer the copy to the overflow server 120, and install the copy on the overflow server 120. Any means of copying and transferring data known in the art or developed in the future, may be used to transfer the copied website 110 (illustrated in FIG. 2 as a dotted-line representation of the website 110 on the overflow server 120) including those described in detail above.

The means for redirecting 220 may comprise installed software and/or scripts that cause the first server 100 to redirect traffic to the overflow server 120 using any method and/or technology known in the art or developed in the future for redirecting traffic from one server to another including, but not limited to URL forwarding, redirecting, masking and/or any combination thereof. This may be accomplished by manual redirection, using HTTP 3xx status codes, server-side redirection scripting, .htaccess files, meta refresh redirection, JavaScript redirects, frame redirects, and/or redirect loops. Such redirection software and/or scripts may also update the DNS record for the website's 110 domain name to reflect the overflow server's 120 IP address.

Figure 3:
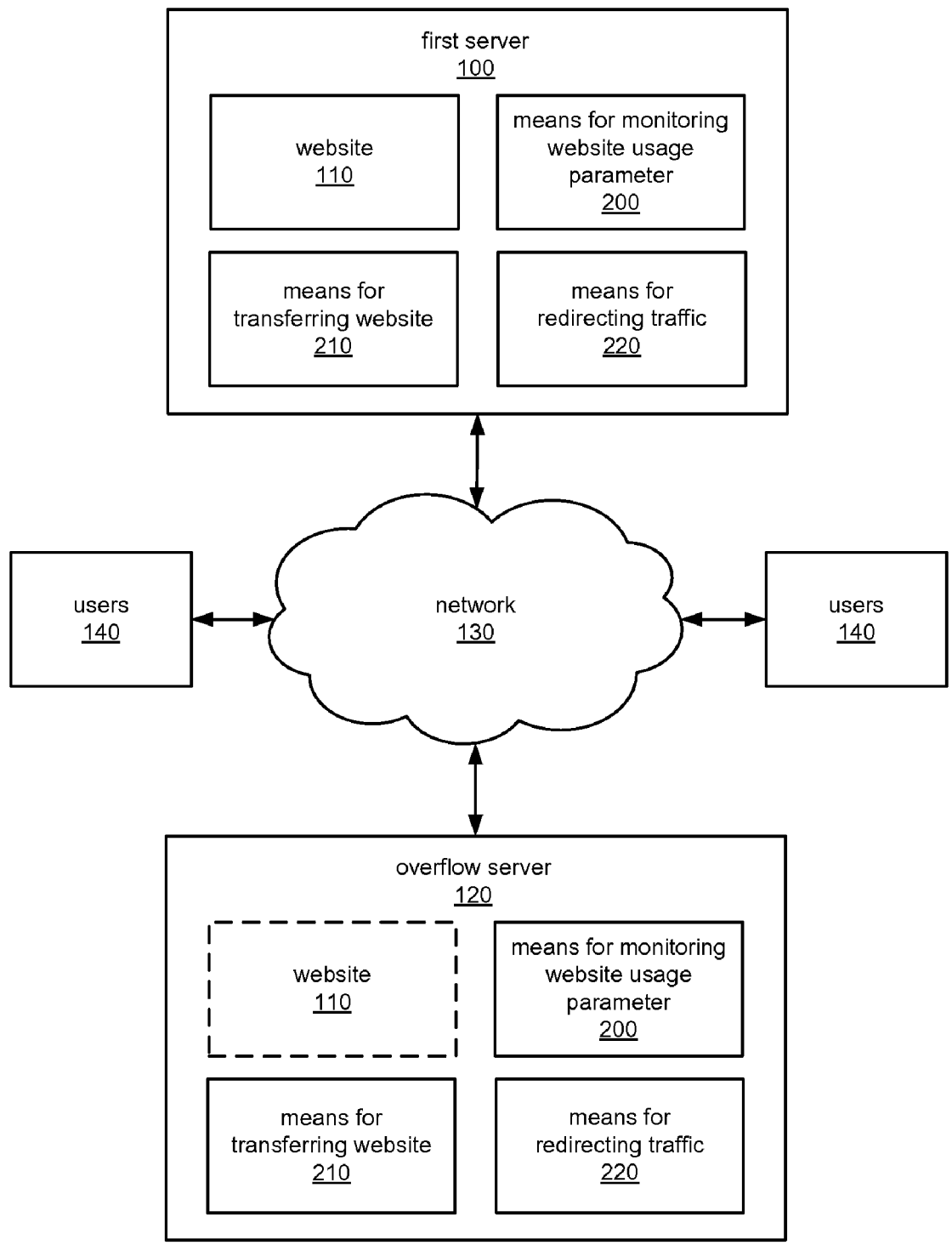
FIG. 3 illustrates a possible embodiment of a system for providing website hosting overage protection.

As illustrated in FIG. 3, the overflow server 120 also may comprise means for monitoring 200 the website usage parameter, means for automatically transferring 210 the website back to the first server 100 when the website usage parameter falls below a second predetermined value, and means for redirecting 220 a plurality of traffic from the overflow server 120 back to first server 100. This embodiment comprises a complete solution to the traffic spike problem described above by providing a system that transfers the website 110 to an overflow server 120 when a traffic spike is detected and returns the website 110 to the first server 100 when the spike concludes.

Figure 4:
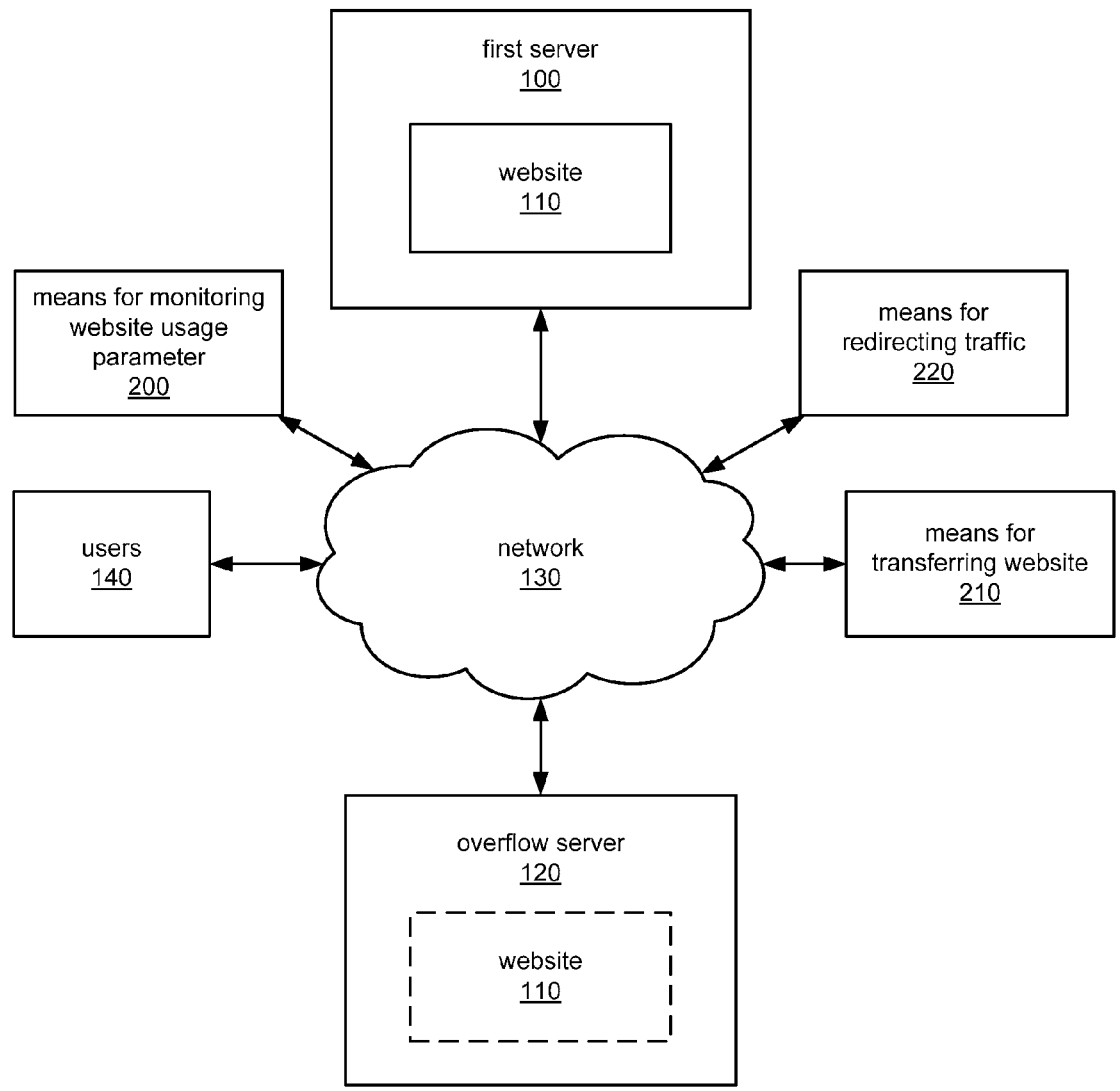
FIG. 4 illustrates a possible embodiment of a system for providing website hosting overage protection.

FIG. 4 illustrates a highly-distributed system for providing website hosting overage protection, wherein the means for monitoring 200, means for transferring 210, and means for redirecting 220 may not reside in the memory of either the first server 100 or the overflow server 120. Rather they are communicatively coupled to the first server 100 and/or the overflow server 120 via the network 130. In this example embodiment, the means for monitoring 200, means for transferring 210, and means for redirecting 220 may comprise standalone systems and/or reside in the memory of another server or computer.

Several different methods may be used to provide website hosting overage protection. In the example embodiment illustrated in FIG. 5, a website 110 may be hosted on a first server 100 (Step 500). A website usage parameter may then be monitored (Step 510). If (when) the website usage parameter exceeds a first predetermined value, the website 110 may be automatically transferred to an overflow server 120 (Step 520). Traffic to the website 110 may then be redirected to the overflow server 120 (Step 530).

Website hosting (Step 500) and/or storage may be accomplished by any hosting method known in the art or developed in the future including, but not limited to using a third-party hosting provider's hosting service, such as any of GODADDY.COM's hosting plans. The hosting service may utilize shared, virtual-dedicated, and/or dedicated hosting technology. Alternatively, the website 110 may be hosted on a privately-owned and/or operated first-server 100 or any other computer.

The website usage parameter may be monitored (Step 510) by any means known in the art or developed in the future for monitoring website usage including, as a non-limiting example, the means for monitoring 200 website usage discussed in detail above. The website usage parameter may comprise any variable that relates to website usage including, but not limited to, a number of website hits, a number of central processing unit cycles, a bandwidth value, and/or any combination thereof.

Figure 6:
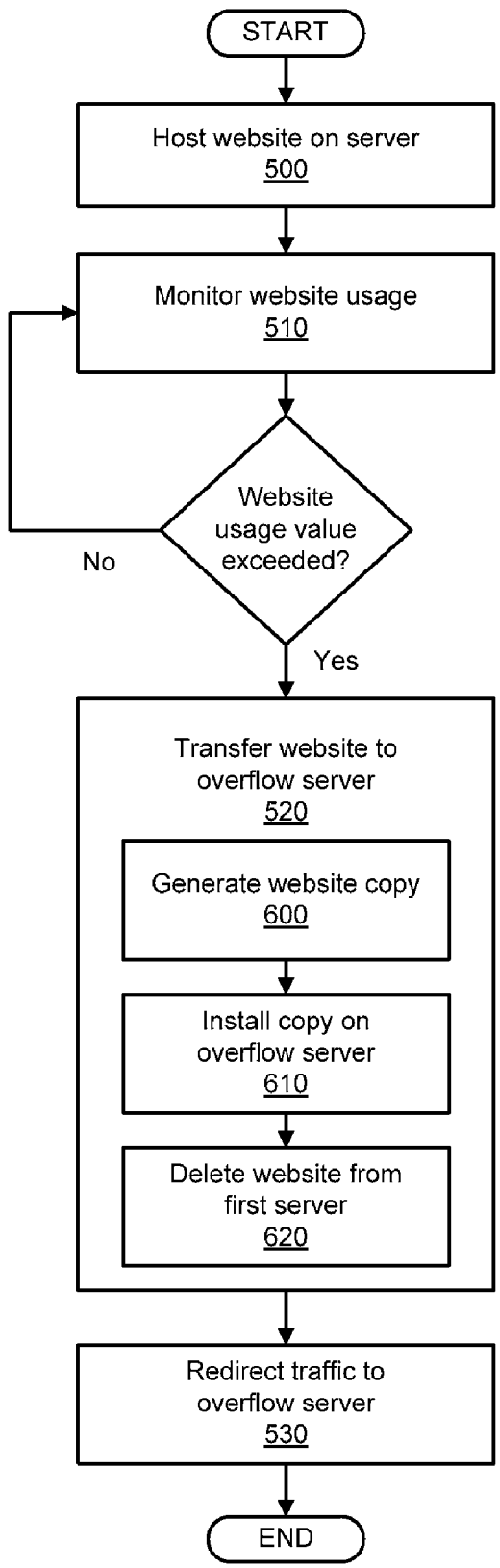
FIG. 6 is a flow diagram illustrating a possible embodiment of a method for providing website hosting overage protection.

If the monitored website usage parameter exceeds a first predetermined value, the website 110 may be automatically transferred to the overflow server 120 (Step 520). This may be accomplished, as a non-limiting example, with the means for transferring 210 the website 110 discussed in detail above. As illustrated in FIG. 6, this website transfer (Step 520) may be accomplished (perhaps with the software and/or scripts described in detail above) by generating a copy of the website 110 (Step 600), installing the copy on the overflow server 120 (Step 610), and deleting the website 110 from the first server 100 (Step 630). This alternate embodiment frees to first server 100 for other uses after the transfer occurs.

Once the website 110 has been transferred to the overflow server 120 (Step 520), some or all traffic to the first server 100 may be redirected to the overflow server 120 (Step 530), perhaps via the means for transferring 210 described in detail above. For example, installed software and/or scripts may cause the first server 100 to redirect traffic to the overflow server 120 using any method and/or technology known in the art or developed in the future for redirecting traffic from one server to another including, but not limited to URL forwarding, redirecting, masking and/or any combination thereof. This may be accomplished by manual redirection, using HTTP 3xx status codes, server-side redirection scripting, . htaccess files, meta refresh redirection, JavaScript redirects, frame redirects, and/or redirect loops. Such redirection software and/or scripts may also update the DNS record for the website's 110 domain name to reflect the overflow server's 120 IP address.

Figure 7:
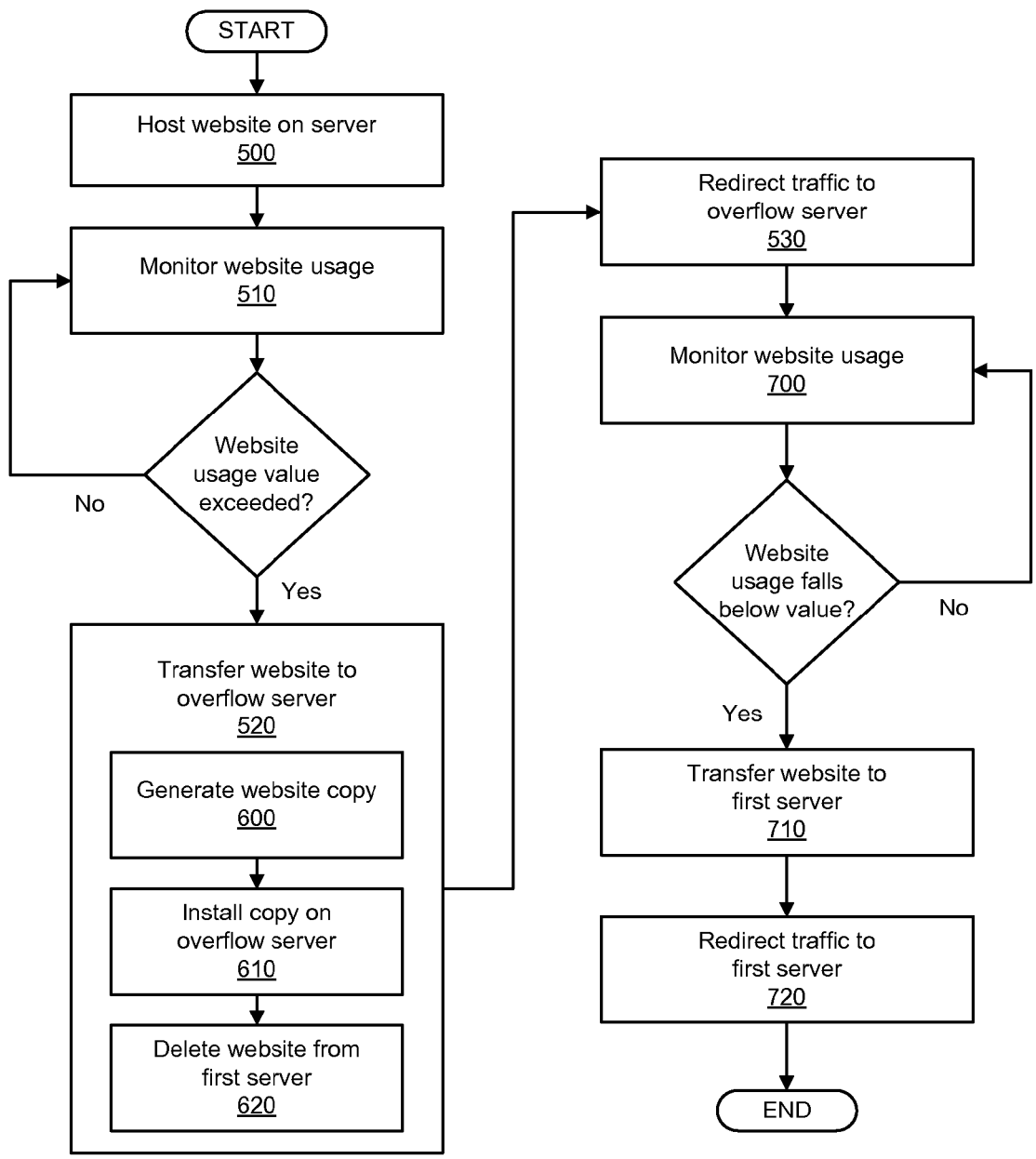
FIG. 7 is a flow diagram illustrating a possible embodiment of a method for providing website hosting overage protection.

In the example embodiment of a method for providing website hosting overage protection illustrated in FIG. 7, after the website 110 is transferred to the overflow server 120 (Step 530), the overflow server 120 may be monitored (Step 700) for any of the website usage parameters—using any of the systems or methods for monitoring—discussed in detail above. If the website usage parameter falls below a second predetermined value, the website 110 may then be transferred back to the first server 100 (Step 710), perhaps using the transferring means 210 described above. Alternatively, the website 110 may be transferred to any other server or computer. Traffic seeking the website 110 on the overflow server 120 then may be redirected back to the first server 100 (Step 720) (or other server or computer) using the methods and systems described elsewhere herein. This example embodiment temporarily moves the website 110 to an overflow server 120 during a traffic spike while freeing the first server 100 for other uses during the spike.

Figure 8:
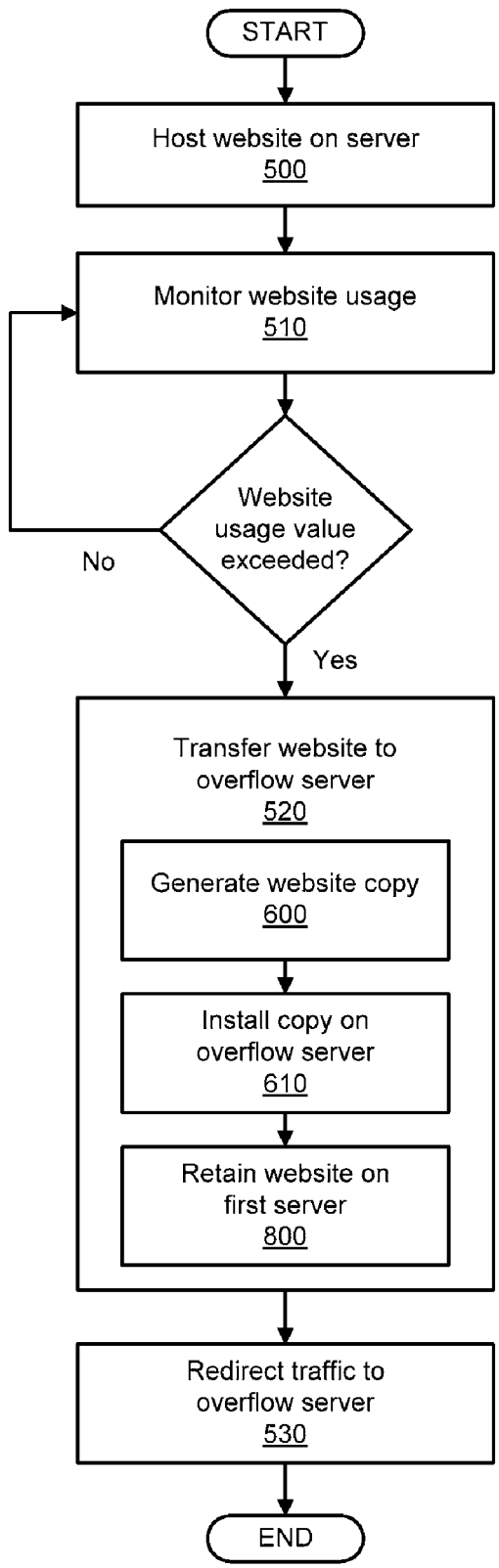
FIG. 8 is a flow diagram illustrating a possible embodiment of a method for providing website hosting overage protection.

FIG. 8 illustrates an example embodiment of a method for providing website hosting overage protection wherein the website 110 is not deleted from the first server 100 after a copy is transferred to the overflow server 120. This embodiment may be preferable where the anticipated traffic surge (spike) to the website 110 is short and the first server 100 is not needed for other uses. In this embodiment, the website transfer (Step 520) may comprise the steps of generating a copy of the website 110 (Step 600), installing the copy on the overflow server 120 (Step 610), and retaining the website on the first server 100 (Step 800).

Figure 9:
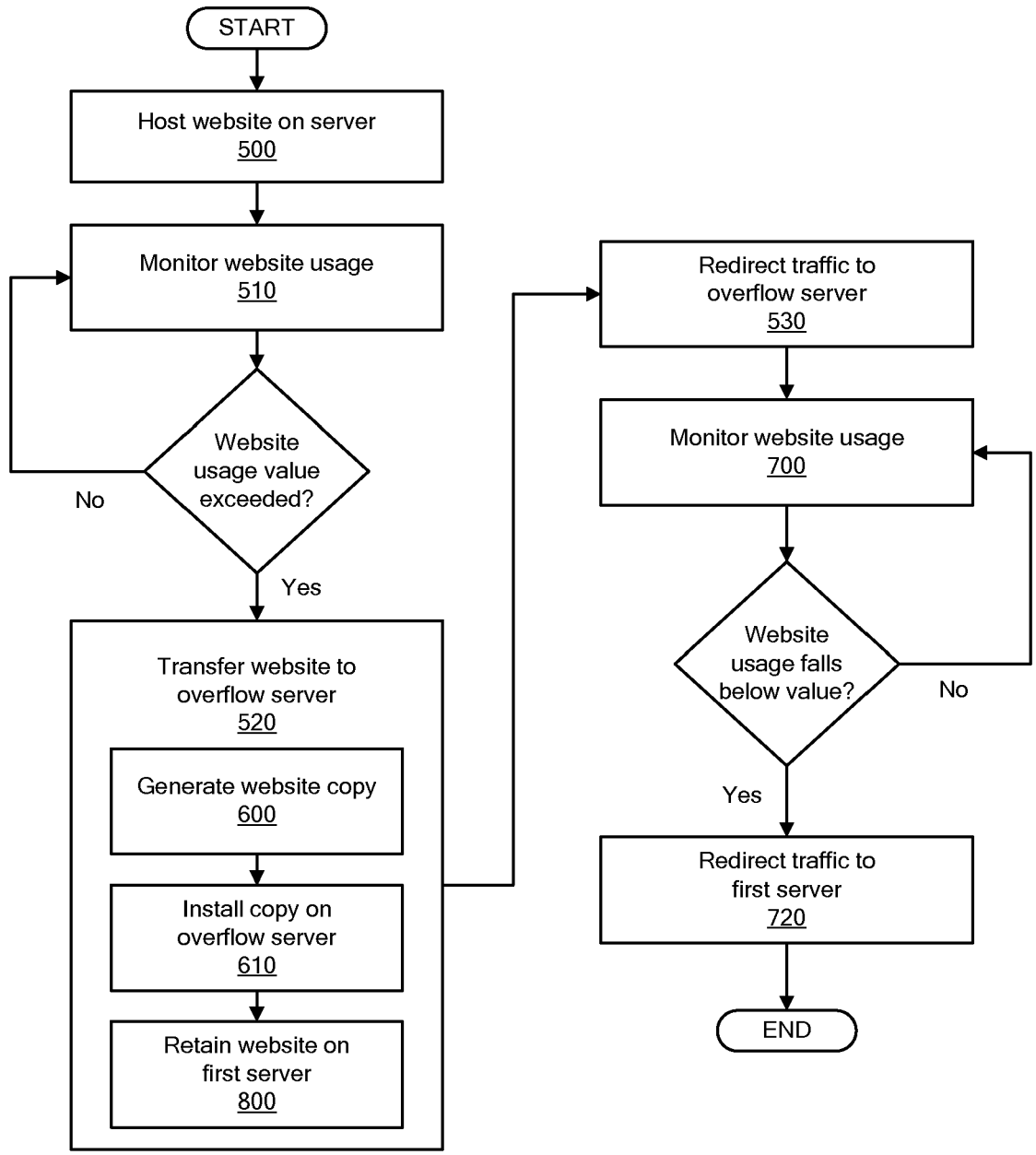
FIG. 9 is a flow diagram illustrating a possible embodiment of a method for providing website hosting overage protection.

As illustrated in FIG. 9, after the website 110 is transferred to the overflow server 120 (Step 530), the overflow server 120 may be monitored (Step 700) for any of the website usage parameters—using any of the systems or methods for monitoring—discussed in detail above. If the website usage parameter falls below a second predetermined value, traffic seeking the website 110 on the overflow server 120, then may be redirected back to the first server 100 (Step 720) (or other server or computer) using the methods and systems described elsewhere herein.

An example use of the systems and methods described herein, a hosting provider may host a customer's website 110 on a first server 100 (Step 500). The website 110 may, for example, comprise a political blog that has links to photograph and/or video files of the presidential candidates. The customer, not expecting substantial traffic to his website 110, may have purchased a low-cost shared hosting plan from the hosting provider. Accordingly, the customer's website 110 (and its content) may be stored on the first server 100, along with numerous other customers' websites, all of which must share the first server's 100 limited computing resources (e.g., CPU cycles and/or bandwidth).

If the website 110 posts a file (e.g., photograph and blog article regarding a political candidate) that is interesting to Internet users 140, the website 110 may get linked to one of the many community-driven content aggregation and bookmarking online services, such as www.digg.com. This may result in a link to the website being promoted to www.digg.com's front webpage, which may cause traffic (and therefore CPU cycles, website hits, and/or bandwidth load) to suddenly spike and exceed the website 110 customer's memory, bandwidth, and/or CPU usage allotment with the hosting provider. Alternatively, such a spike may overload the first server 100 and cause it to underperform, slow down, and/or "crash."

To avoid this outcome, the hosting provider may monitor the website's 110 bandwidth demand (Step 510), perhaps with properly-configured software and/or scripts (such as described in detail above) installed in memory on the first server 100. When the software detects a surge in bandwidth demand from the website 110 (e.g., the bandwidth demand exceeds a first predetermined value), the software and/or scripts may automatically copy the website 110 (Step 600), transfer the website 110 to the overflow server 120 over the network 130 (perhaps via an FTP transfer) (Step 520), and install the website 110 on the overflow server 120 (Step 610). Web traffic to the first server 100 (seeking the website 110) may then be redirected to the overflow server 120 (Step 530). If, even after the website 110 transfer, the first server 100 is in a high-demand environment, the website 110 may be deleted from the first server 100 to free up computing power (Step 620).

Transferring the Website to a Clustered Hosting Solution

Figure 10:
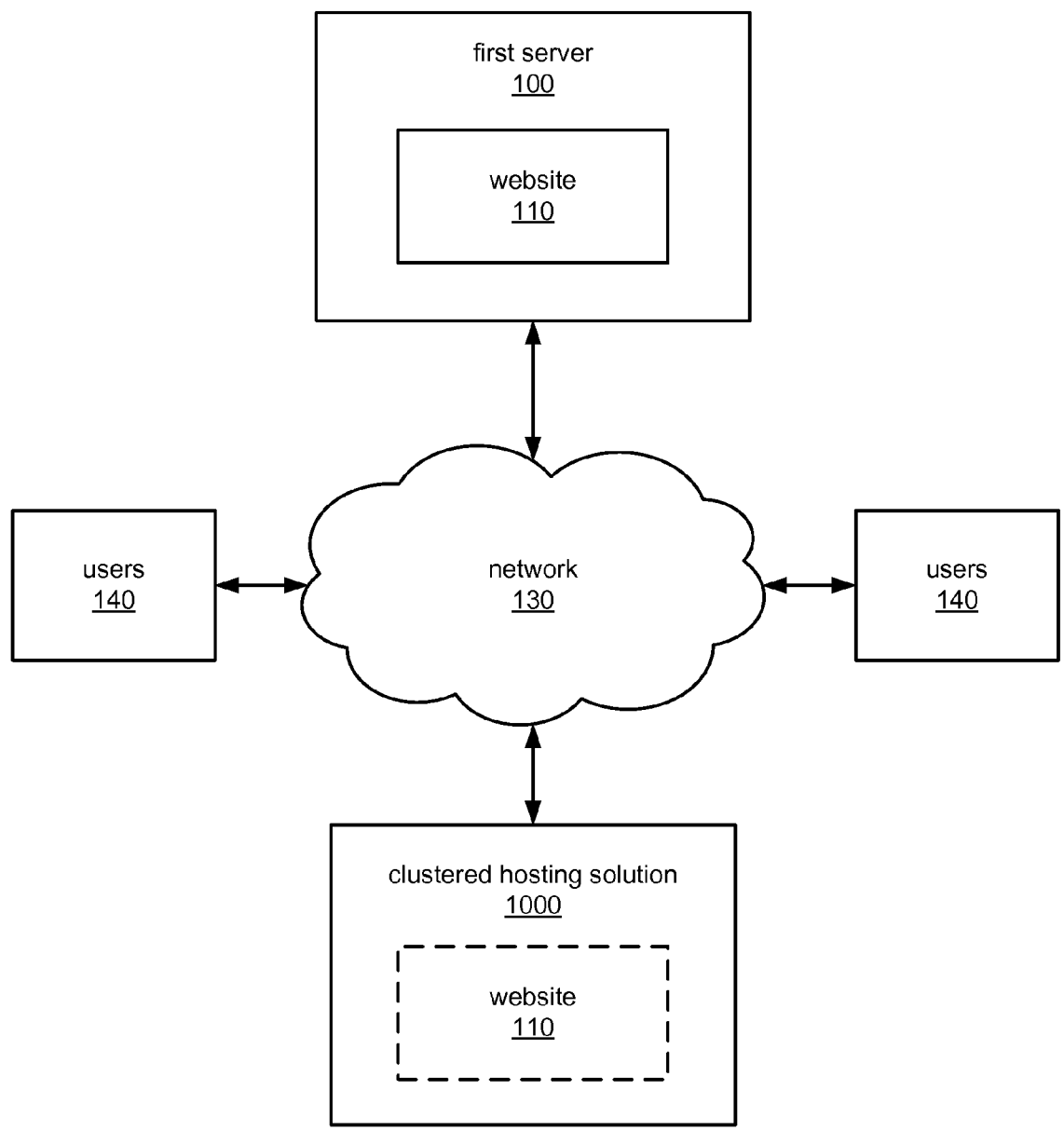
FIG. 10 illustrates a possible embodiment of a system for providing website hosting overage protection.

FIG. 10 illustrates an alternate embodiment of a system for providing website hosting overage protection, in which the overflow server 120 comprises a clustered hosting solution 1000. A computer "cluster" may comprise a plurality of communicatively coupled computers or servers working together that may appear to a user 140 as a single computer or server. Clustered computers or servers may be used improve performance and/or availability over that provided by a single computer or server. The computers or servers in a cluster may be connected to each other, perhaps via high-speed local area networks.

Clustered hosting solutions 1000 overcome many limitations associated with traditional shared hosting systems by providing hosting customers with a "clustered" approach to load balancing, security, and website resource management. A clustered hosting solution 1000 may provide a hosting customer with hosting resources that far exceed those available with one hosting server. Accordingly, a hosted website 110 may share the processing power of many servers, perhaps with other websites. Having numerous servers sharing website hosting responsibilities decreases the probability that any website usage parameter (e.g., website hits, central processing unit cycles, bandwidth utilization, disk utilization, and/or number of connections) will cause failure or other functionality problems for the website 110 or any other website hosted on the cluster. Security also may be improved because a clustered hosting solution 1000 may employ additional security protections, including intelligent routing, redundant switching, and/or firewall and proxy technology.

Figure 11:
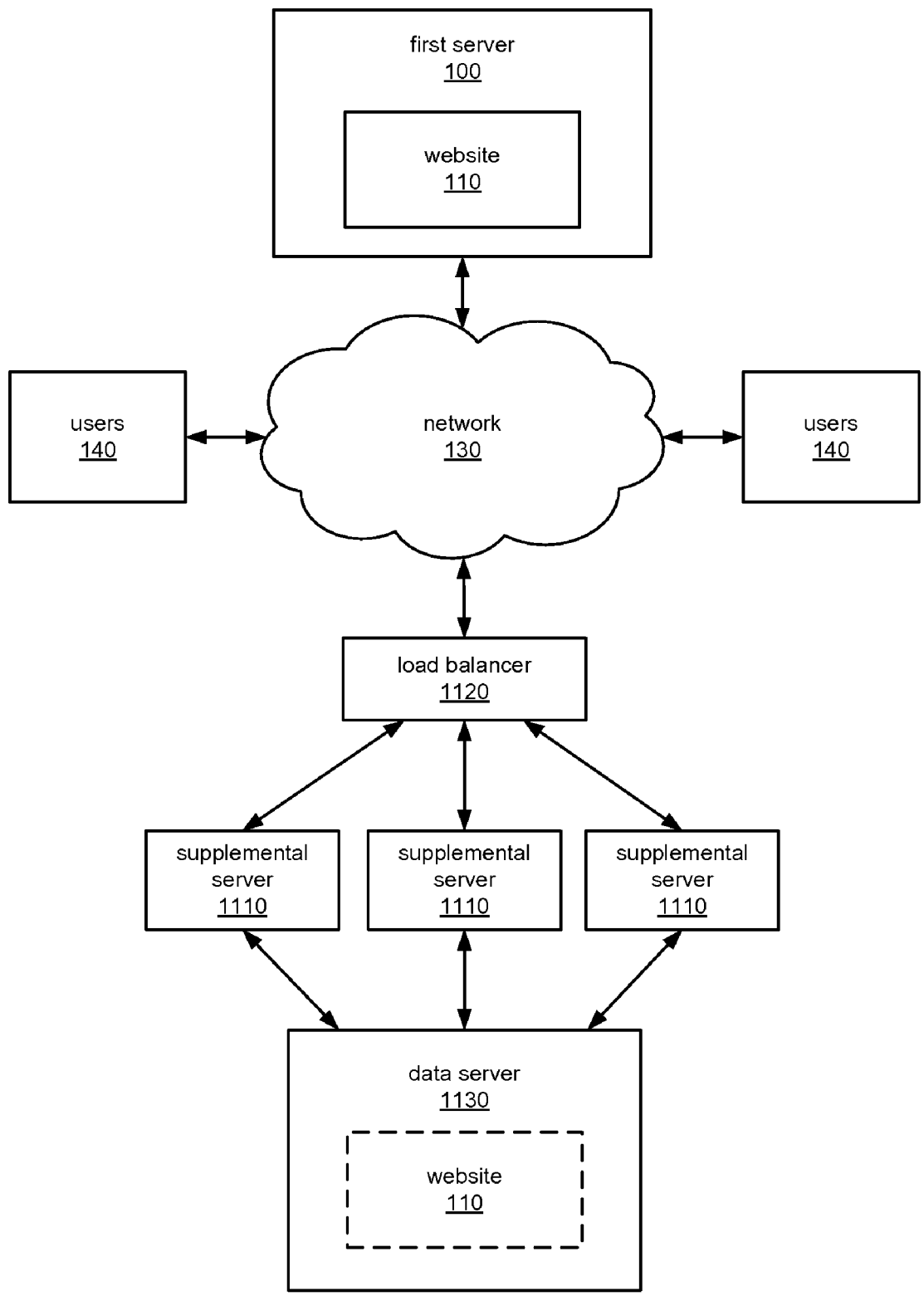
FIG. 11 illustrates a possible embodiment of a system for providing website hosting overage protection.

FIG. 11 illustrates a more detailed embodiment of a system for providing website hosting overage protection, in which the clustered hosting solution 1000 comprises a load balancer 1120, a data server 1130, and a plurality of supplemental servers 1110. The data server 1130 may comprise a file server, database, and/or any network storage device having the ability to store the website 110 for access by any of the supplemental servers 1110 and, ultimately, users 140 via the network 130. The supplemental servers 1110 and the data server 1130 may comprise any of the server types described in detail above. All components may be communicatively coupled to each other via any method of network connection known in the art or developed in the future including, but not limited to those described in detail above.

A load balancer 1120 may be used to balance work between the plurality of supplemental servers 1110 to maximize resource utilization, throughput, and/or or response time. The load balancer 1120 may comprise a piece of hardware or software that balances the load across the plurality of supplemental servers 1110. As a non-limiting example, it may comprise a software program on the port of the clustered hosting solution 1000 where users 140 connect to access the website 110. The load balancer 1120 may accept an incoming http request, choose a supplemental server 1110 to which it should be redirected, and forward the file request to the selected server. The supplemental server 1110 then may obtain the requested data from the data server 1130 and reply to the load balancer 1120, which in turn may reply to the user 140 with the requested data or file. With this embodiment, the user 140 may have no knowledge of the internal separation of functions within the clustered hosting solution 1000. Any load balancing software or hardware known in the art, or developed in the future, may be used including, but not limited to proprietary, third-party, or open source systems or software. Examples include MICROSOFT'S NETWORK LOAD BALANCING SERVICES, CICSO APPLICATION CONTROL ENGINE 4710 APPLIANCES, or IPVS (IP VIRTUAL SERVER).

In this example embodiment, the first server 100 may be configured to automatically transfer the website 110 to the data server 1130 and redirect traffic to the plurality of supplemental servers 1110 (perhaps via the load balancer 1120) when a website usage parameter exceeds a first predetermined value. This functionality may be implemented (and these method steps accomplished) using software and/or function-specific scripts as discussed in detail above.

Figure 11A:
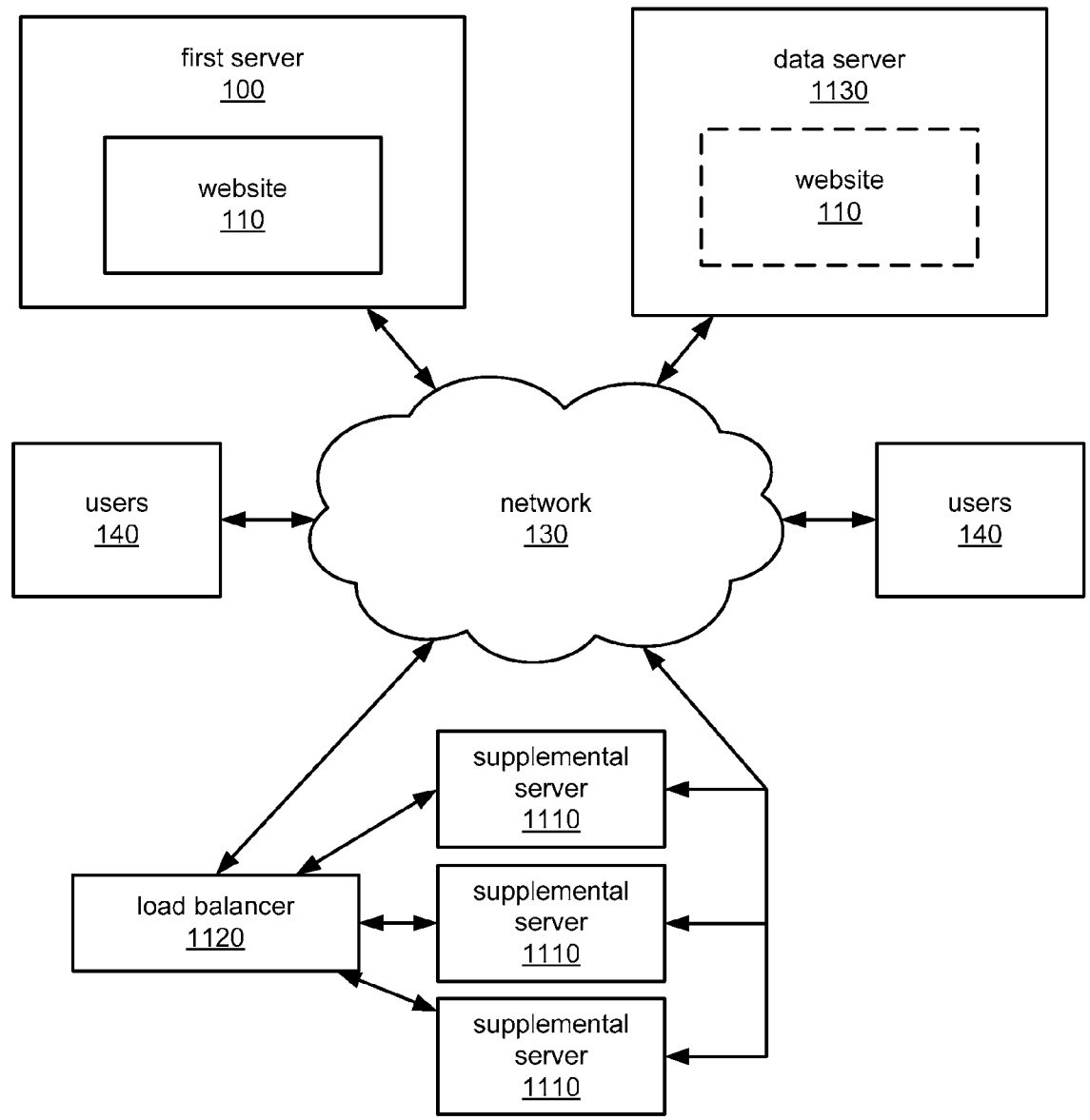
FIG. 11a illustrates a possible embodiment of a system for providing website hosting overage protection.

FIG. 11a illustrates an alternate system, in which the clustered hosting solution 1000 also may comprise a data server 1130 communicatively coupled directly to the network 130. The data server 1130 may comprise a file server, database, and/or any network storage device having the ability to store the website 110 for access by the first server 100, supplemental servers 1110 and, ultimately, users 140 via the network 130. When a website usage parameter exceeds a first predetermined value, the website may be transferred to the data server 1130, where it may be accessed by the supplemental servers 1110 via the network 130. Accordingly, the supplemental servers 1110 may be communicatively coupled directly to the network 130 as well as the load balancer 1120. With this embodiment, the load balancer 1120 may accept an incoming http request, choose a supplemental server 1110 to which it should be redirected, and forward the file request to the selected server. The supplemental server 1110 then may obtain the requested data directly from the data server 1130 and reply to the user 140 via the network 130, bypassing the load balancer 1120 in the process.

Figure 5:
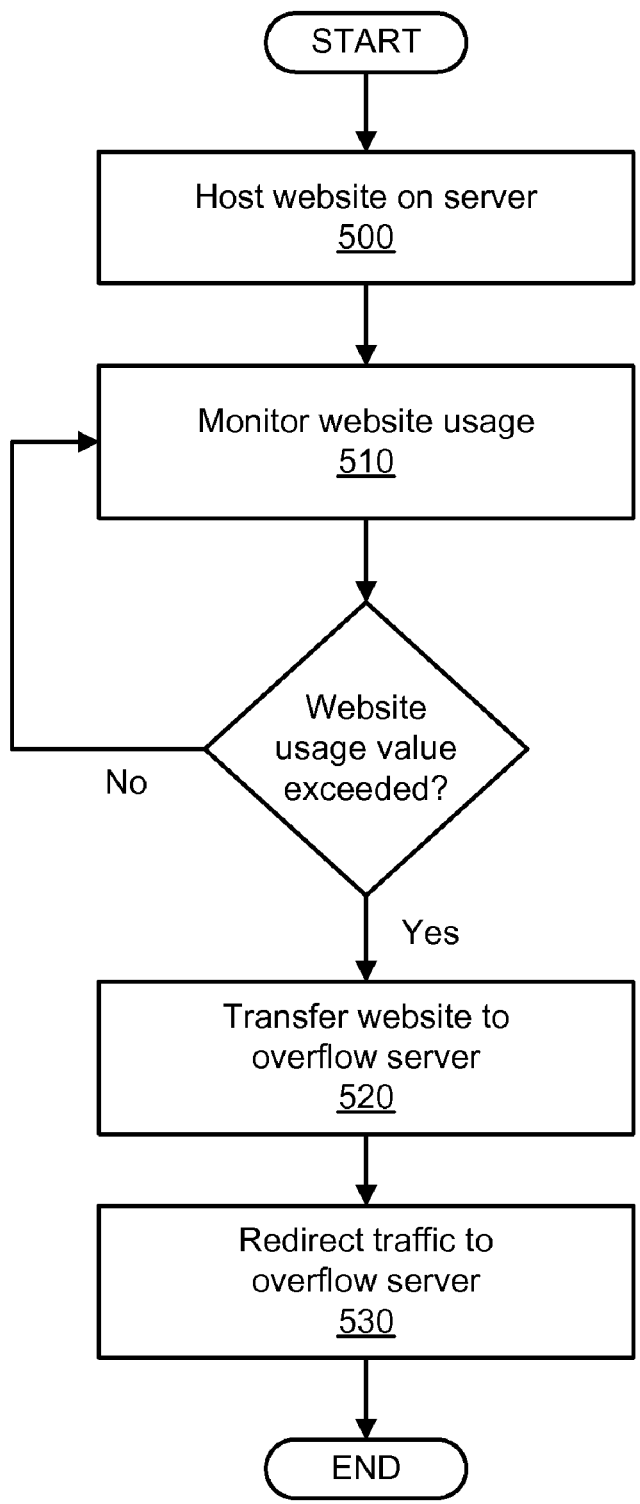
FIG. 5 is a flow diagram illustrating a possible embodiment of a method for providing website hosting overage protection.
Figure 12:
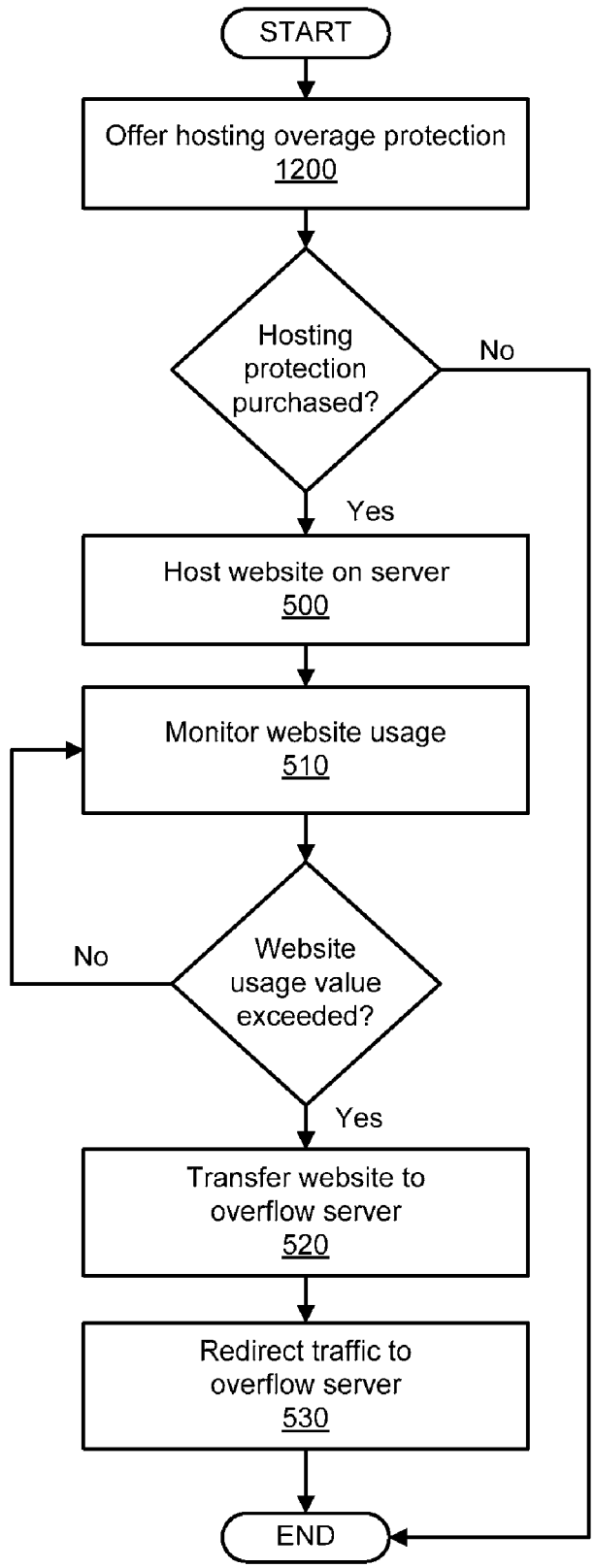
FIG. 12 is a flow diagram illustrating a possible embodiment of a method for providing website hosting overage protection.

FIG. 12 illustrates a method of providing website overage protection that, prior to the steps detailed in FIG. 5, may comprise the steps of offering for purchase a hosting overage protection service via a hosting provider's website (Step 1200) and (if the hosting overage protection service is purchased by a customer), proceeding to host the customer's website 110 on a first server 100 (Step 500). The hosting overage protection service may be implemented, if purchased, by any of the systems and/or methods described herein. Such a service may act as insurance to hosting customers whose website 110 may be susceptible to a traffic spike.

Website Content Storage on a Data Server (a Non-Transferring Solution)

The following embodiments provide for website overage protection by originally storing website content on an independent data server, thereby obviating the need for transferring the website 110 to an overflow server 120 or clustered hosting solution 1000 when a traffic surge occurs (i.e., when a website usage parameter exceeds a first predetermined value).

Figure 13:
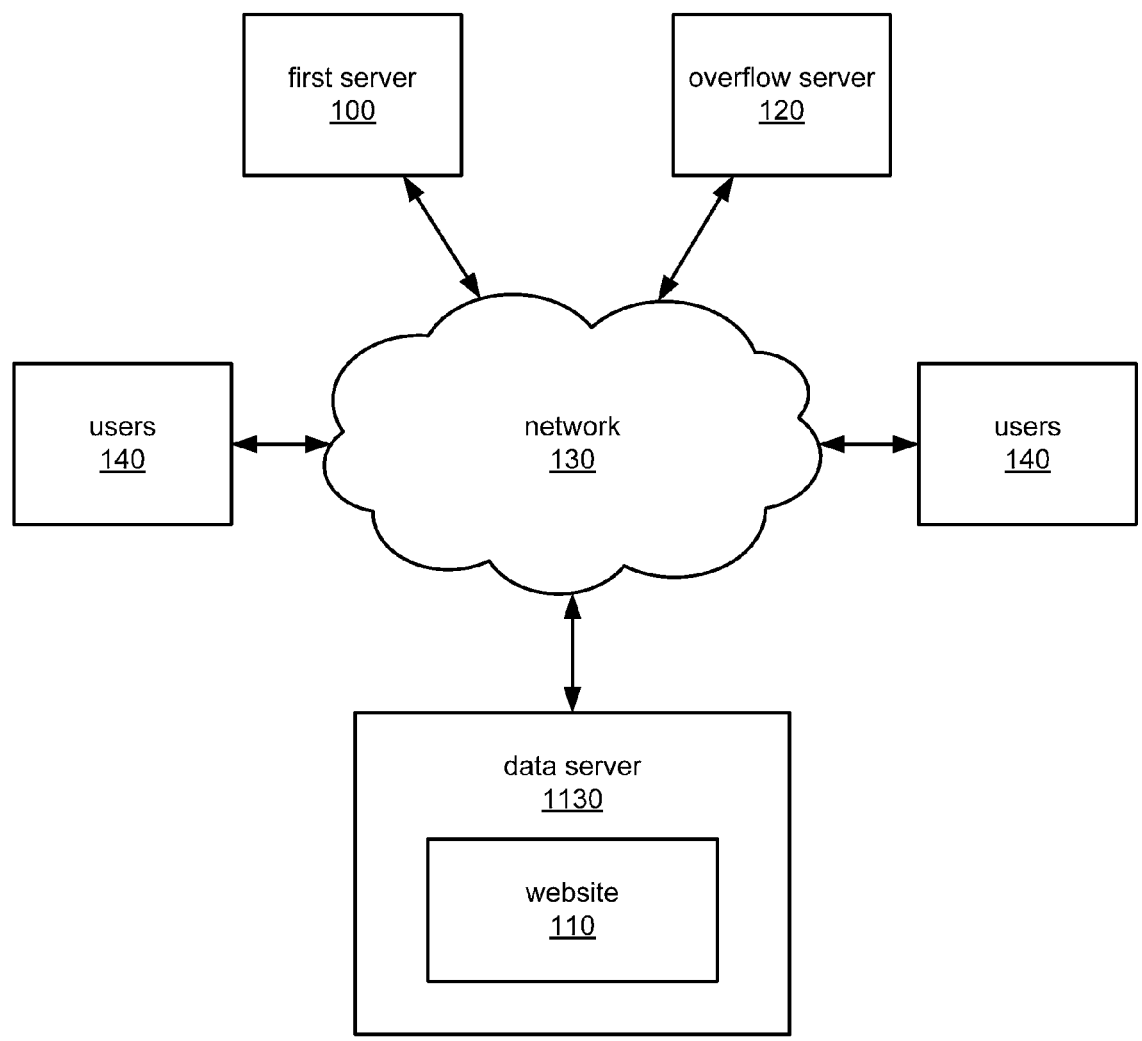
FIG. 13 illustrates a possible embodiment of a system for providing website hosting overage protection.

FIG. 13 illustrates a system, in which a data server 1130 may store all data and/or files associated with the website 110 at all times. The illustrated embodiment may comprise a first server 100 to which a plurality of traffic seeking a website 110 may be directed. The first server 100 may be configured to automatically redirect such traffic to an overflow server 120 when a website usage parameter exceeds a first predetermined value. This embodiment also may comprise a data server 1130 storing the website's 110 content, which may be accessible to the first server 100 (and said overflow server 120) via the network 130, which may communicatively couple the data server, 1130 the first server 100, the overflow server 120, and the plurality of users 140.

With this example embodiment, traffic may initially be directed to the first server 100. When a website usage parameter exceeds a first predetermined value, traffic may then be redirected to the overflow server 120. The data server 1130 may comprise a file server, database, and/or any network storage device having the ability to store the website 110 for access by the first server 100, overflow server 120 and, ultimately, users 140 via the network 130. Utilizing the techniques described above, the first server 100 may be configured to automatically redirect a plurality of traffic to the overflow server 120 when a website usage parameter exceeds a first predetermined value. Conversely, the overflow server 120 may be configured to automatically redirect traffic back to the first server 100 when the website usage parameter falls below a second predetermined value. All components in this illustrated embodiment may be communicatively coupled to each other via any method of network connection known in the art or developed in the future.

Figure 14:
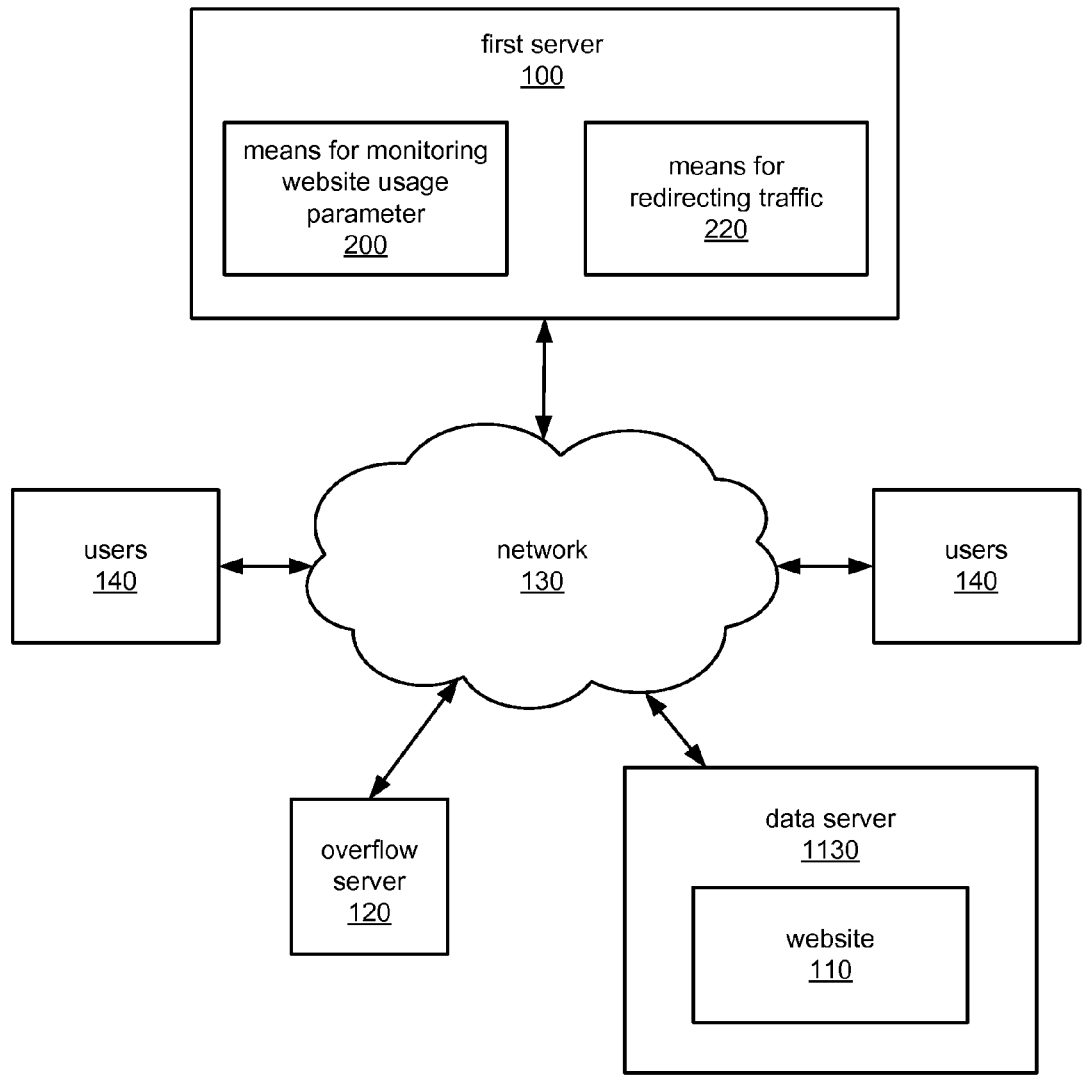
FIG. 14 illustrates a possible embodiment of a system for providing website hosting overage protection.

FIG. 14 illustrates another embodiment comprising a first server 100 to which a plurality of traffic seeking a website 110 may be directed, an overflow server 120, means for monitoring 200 a website usage parameter, means for automatically redirecting 220 a plurality of traffic from the first server 100 to the overflow server 120 when the website usage parameter exceeds a first predetermined value, and a data server 1130 storing the website's 110 content, which is accessible to the first server 100 and the overflow server 120 via the network 130 communicatively coupling each component. Both the monitoring and redirecting means (200 and 220, respectively) may be implemented as described in detail above.

Figure 15:
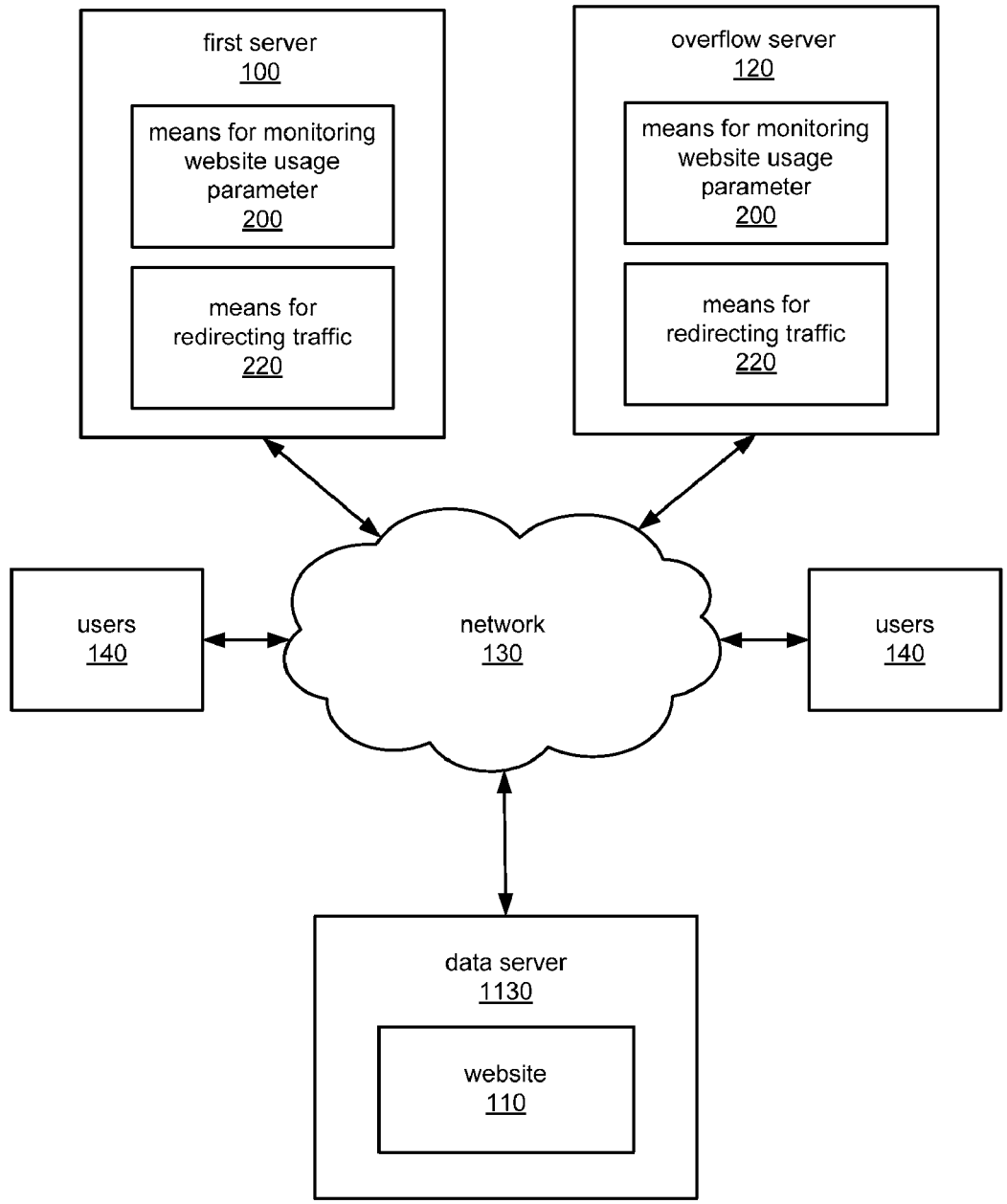
FIG. 15 illustrates a possible embodiment of a system for providing website hosting overage protection.

The first server 100 may comprise means for monitoring 200 a website usage parameter and means for redirecting 220 a plurality of traffic from the first server 100 to the overflow server 120 when the website usage parameter exceeds a first predetermined value. And as illustrated in FIG. 15, the overflow server 120 also may comprise means for monitoring 200 a website usage parameter and means for redirecting 220 traffic back to the first server 100 when the website usage parameter falls below a second predetermined value. Alternatively, the monitoring means 200 and redirecting means 220 may not reside in the memory of either the first server 100 or the overflow server 120. Rather they may be communicatively coupled to the first server 100 and/or the overflow server 120 via the network 130. As illustrated in FIG. 4, the means for monitoring 200 and means for redirecting 220 may comprise standalone systems and/or reside in the memory of another server or computer.

Figure 16:
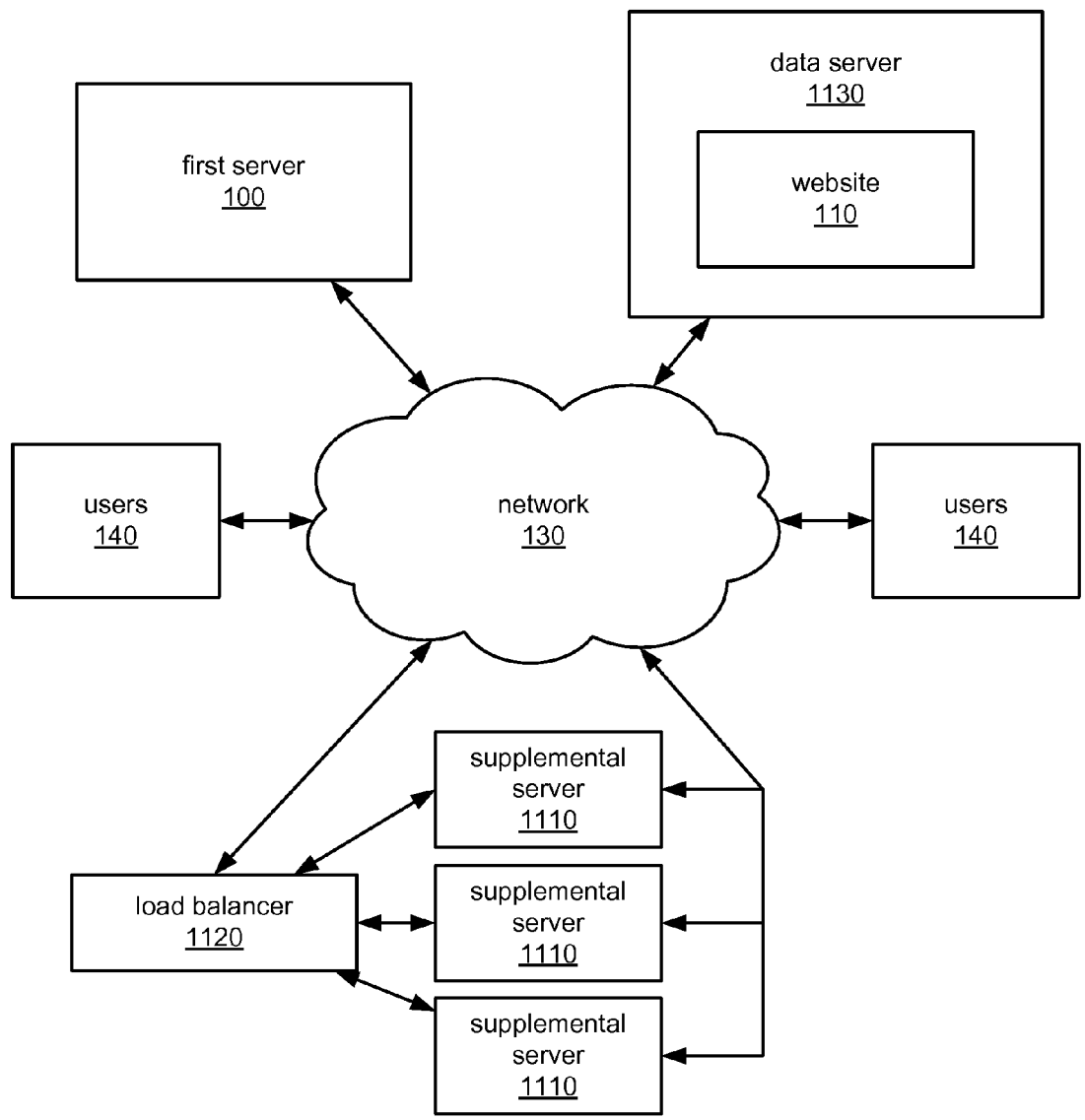
FIG. 16 illustrates a possible embodiment of a system for providing website hosting overage protection.

FIG. 16 illustrates another alternate embodiment of a system for providing website hosting overage protection. With this example embodiment, traffic initially may be directed to the first server 100. When a website usage parameter exceeds a first predetermined value, traffic may then be redirected to a clustered hosting solution 1000, which as illustrated in FIG. 16 may comprise a load balancer 1120 and plurality of supplemental servers 1110, as are described in detail above. The supplemental server 1110 assigned the task by the load balancer 1120 may access website 110 content stored in the data server 1130 via the network 130 to return to the users 140.

Figure 17:
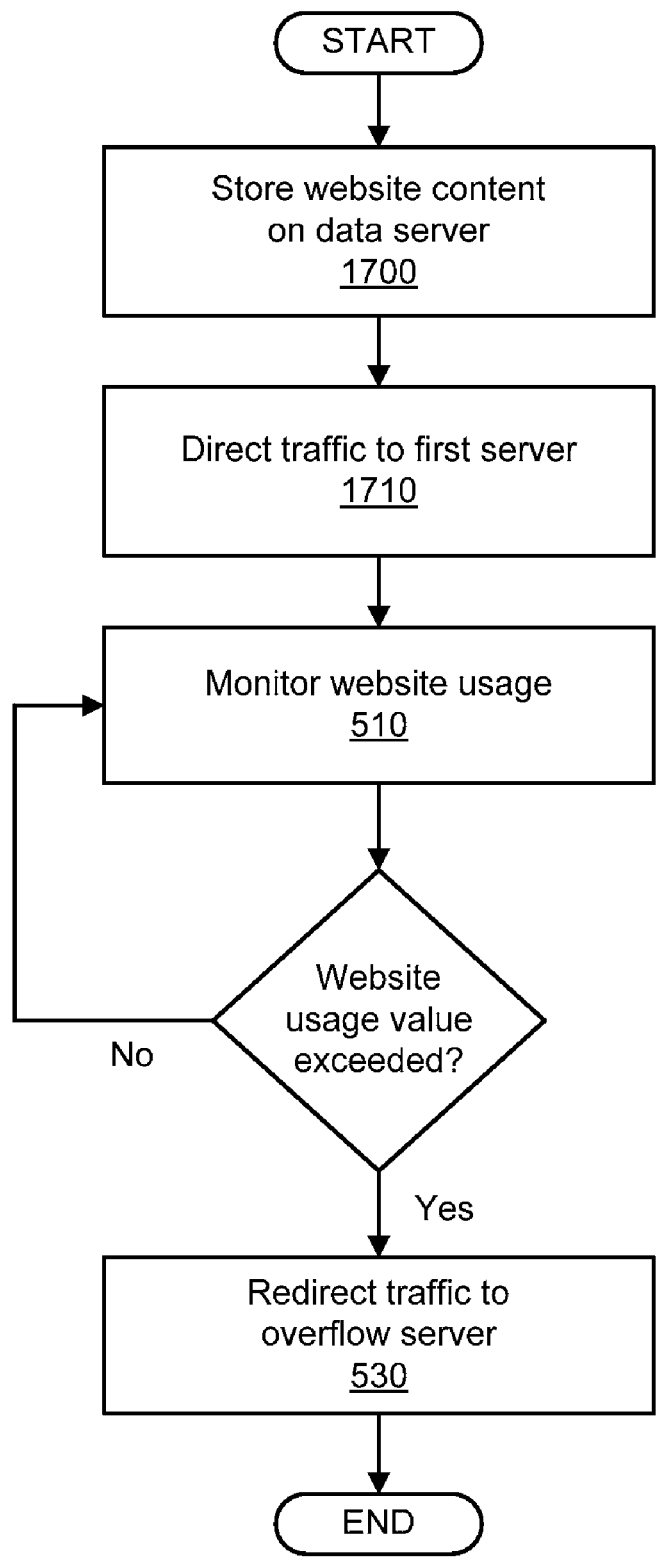
FIG. 17 is a flow diagram illustrating a possible embodiment of a method for providing website hosting overage protection.

FIG. 17 illustrates a method for providing website hosting overage protection. With this method, a website's 110 content may be stored on a data server 1130 communicatively coupled to a network 130 (Step 1700). Traffic seeking the website 110 may be directed to a first server 100 having access to the website's 110 content on the data server 1130 via the network 130 (Step 1700). A website usage parameter may then be monitored (Step 510). If (when) the website usage parameter exceeds a first predetermined value, traffic to the website 110 then may be automatically redirected to the overflow server 120, which may have access to the website's 110 content on the data server 1130 via the network 130 (Step 530).

Website content storage (Step 1700) and/or storage may be accomplished by any data storage or hosting method known in the art or developed in the future including, but not limited to using a third-party hosting provider's hosting service, such as any of GODADDY.COM's hosting plans. The hosting service may utilize shared, virtual-dedicated, and/or dedicated hosting technology. Alternatively, the website 110 may be hosted on a privately-owned and/or operated data server 1130 or any other network storage device. Users 140 seeking website 110 content (i.e., traffic) may be directed to the first server 100 (Step 1710) by any means known in the art or developed in the future including, but not limited to updating the DNS records to point the website's 110 domain name to the first server's 100 IP address.

When a monitored website usage parameter exceeds a first predetermined value, traffic to the website 110 then may be automatically redirected to the overflow server 120 (Steps 510 and 530) using the methodologies described in detail above. Because, with this embodiment, the website's 110 content is stored on the data server 1130, which is accessible by the overflow server 120 via the network 130, there is no need to transfer the website from its original storage location.

Figure 18:
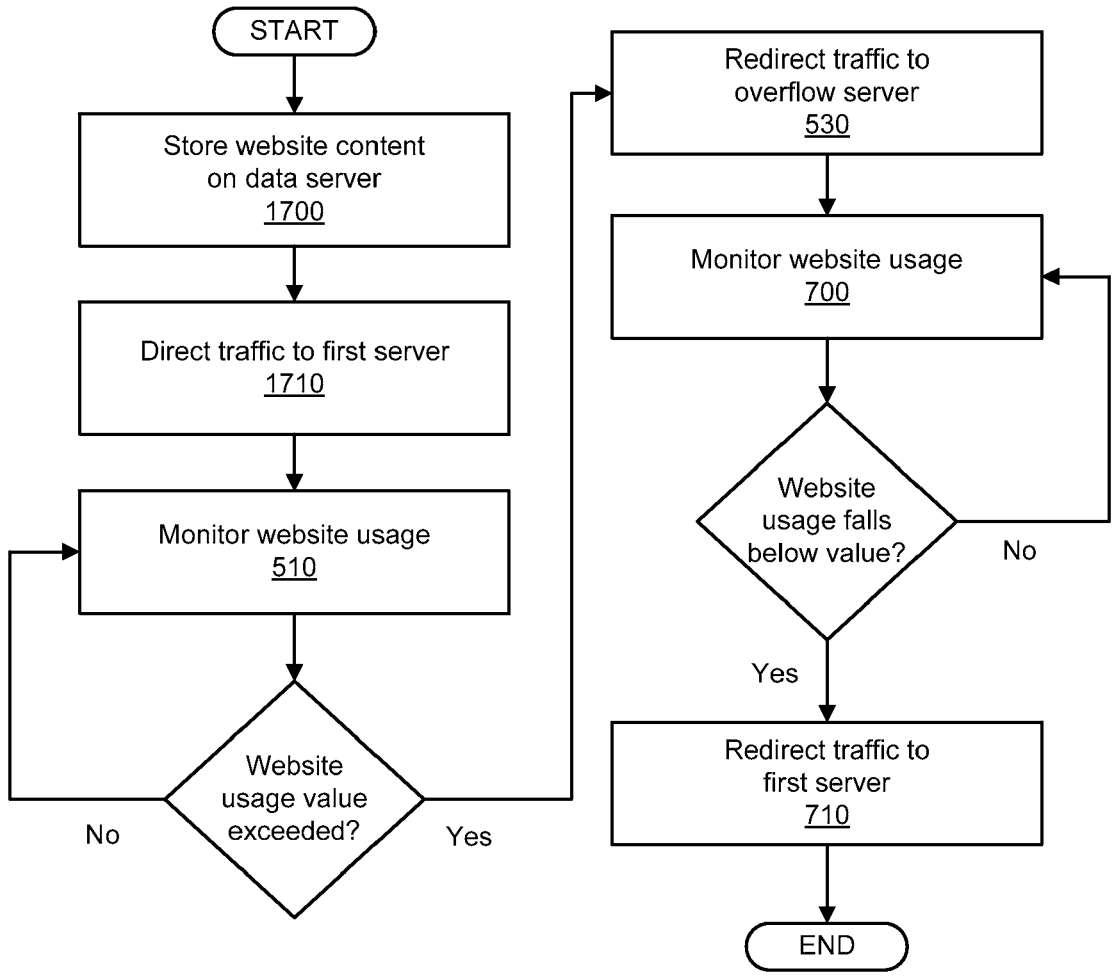
FIG. 18 is a flow diagram illustrating a possible embodiment of a method for providing website hosting overage protection.

FIG. 18 illustrates a similar—but more detailed—method wherein, after traffic is redirected to the overflow server 120 (Step 530), the overflow server 120 may be monitored (Step 700) for any of the website usage parameters—using any of the systems or methods for monitoring—discussed in detail above. If the website usage parameter falls below a second predetermined value, traffic seeking the website 110 on the overflow server 120 then may be redirected back to the first server 100 (Step 720) (or other server or computer) using the methods and systems described elsewhere herein.

Figure 19:
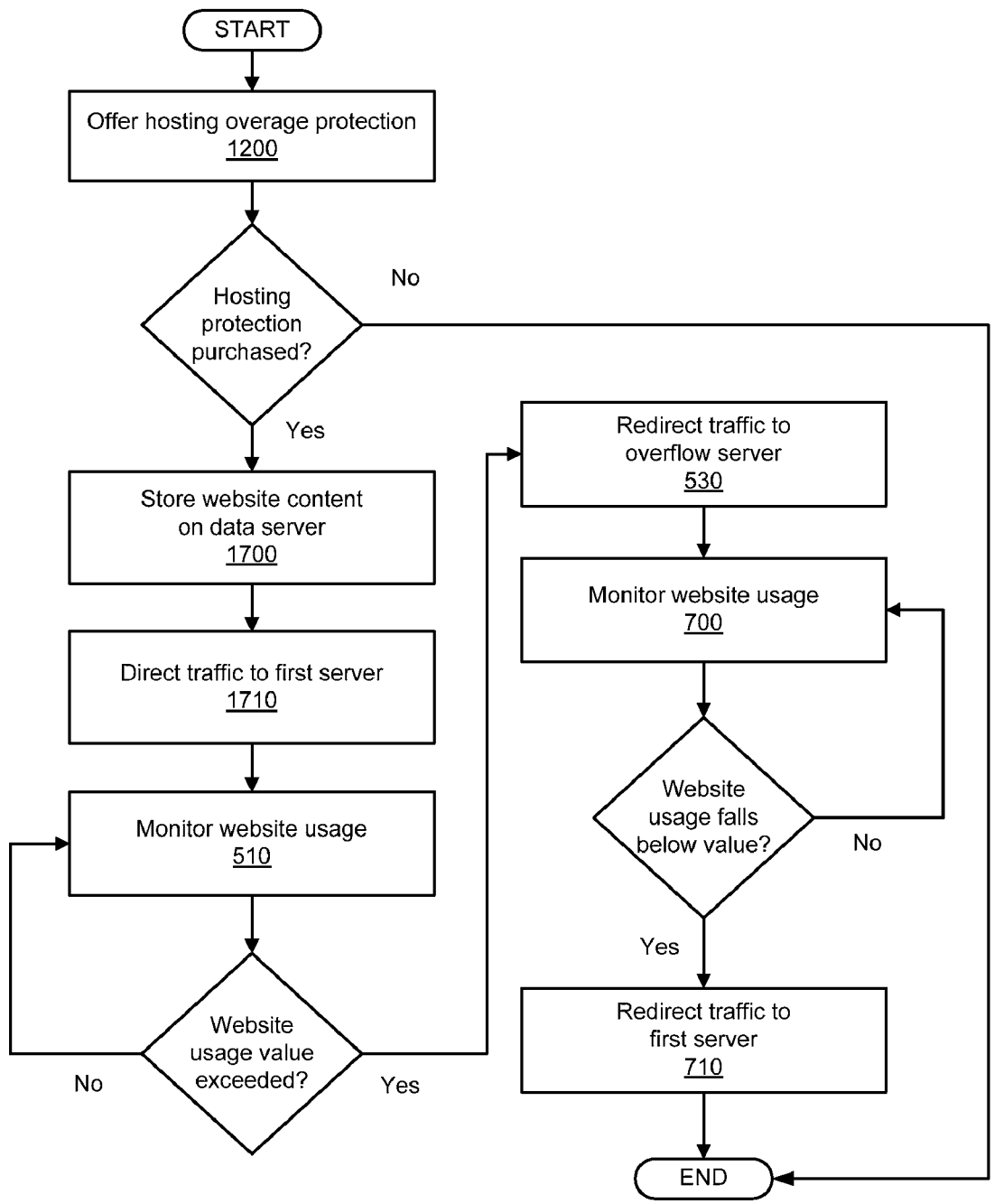
FIG. 19 is a flow diagram illustrating a possible embodiment of a method for providing website hosting overage protection.

FIG. 19 illustrates a method that, in addition to those shown in FIG. 18, further comprises the step of offering for purchase a hosting overage protection service via a hosting provider's website (Step 1200) and (if the hosting overage protection service is purchased by a customer), proceeding to store the website's 110 content on a data server 1130 Step 1700). The hosting overage protection service may be implemented, if purchased, by any of the systems and/or methods described herein. Such a service may act as insurance to hosting customers whose website 110 may be susceptible to a traffic spike.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The invention claimed is:

1. A system, comprising:
   a) a first server hosting a website, said first server configured to automatically transfer said website from said first server to an overflow server and redirect a plurality of traffic from said first server to said overflow server when a website usage parameter exceeds a first predetermined value; and
   b) a network communicatively coupling said first server, said overflow server, and a plurality of users.

2. The system of claim 1, wherein said overflow server is configured to automatically transfer said website back to said first server and redirect said plurality of traffic back to said first server when said website usage parameter falls below a second predetermined value.

3. The system of claim 2, wherein said first server comprises a shared server, a virtual dedicated server, a dedicated server, or any combination thereof.

4. The system of claim 3, wherein said overflow server comprises a shared server, a virtual dedicated server, a dedicated server, or any combination thereof.

5. The system of claim 2, wherein said website usage parameter comprises a measurement of website hits, central processing unit cycles, bandwidth utilization, disk utilization, number of connections, and/or any combination thereof.

6. The system of claim 2, wherein said network comprises the Internet, an intranet, an extranet, a local-area network, a wide-area network, a wired network, a wireless network, a telephone network, or any combination thereof.

7. The system of claim 2, wherein said overflow server comprises a clustered hosting solution.

8. The system of claim 7, wherein said clustered hosting solution comprises:
   i) a load balancer communicatively coupled to said network;
   ii) a plurality of supplemental servers communicatively coupled to said load balancer; and
   iii) a data server communicatively coupled to said plurality of supplemental servers.

9. The system of claim 8, wherein said first server is further configured to automatically transfer said website to said data server and redirect said plurality of traffic to said plurality of supplemental servers via said load balancer when said website usage parameter exceeds said first predetermined value.

10. A system, comprising:
    a) a first server hosting a website;
    b) an overflow server;
    c) means for monitoring a website usage parameter;
    d) means for automatically transferring said website to said overflow server when said website usage parameter exceeds a first predetermined value;
    e) means for redirecting a plurality of traffic from said first server to said overflow server; and
    f) a network communicatively coupling said first server, said overflow server, said means for monitoring, said means for transferring, said means for redirecting, and a plurality of users.

11. The system of claim 10, further comprising:
    g) means for automatically transferring said website back to said first server when said website usage parameter falls below a second predetermined value; and
    h) means for redirecting said plurality of traffic from said overflow server back to said first server.

12. The system of claim 11, wherein said first server comprises a shared server, a virtual dedicated server, a dedicated server, or any combination thereof.

13. The system of claim 12, wherein said overflow server comprises a shared server, a virtual dedicated server, a dedicated server, or any combination thereof.

14. The system of claim 11, wherein said website usage parameter a measurement of website hits, central processing unit cycles, bandwidth utilization, disk utilization, number of connections, and/or any combination thereof.

15. The system of claim 11, wherein said network comprises the Internet, an intranet, an extranet, a local-area network, a wide-area network, a wired network, a wireless network, a telephone network, or any combination thereof.

16. The system of claim 11, wherein said overflow server comprises a clustered hosting solution.

17. The system of claim 16, wherein said clustered hosting solution comprises:
   i) a load balancer communicatively coupled to said network;
   ii) a plurality of supplemental servers communicatively coupled to said load balancer; and
   iii) a data server communicatively coupled to said plurality of supplemental servers.

18. The system of claim 17, wherein said transferring means d) further comprises means for automatically transferring said website to said data server when said website usage parameter exceeds said first predetermined value.

19. The system of claim 18, wherein said redirecting means e) further comprises means for redirecting said plurality of traffic to said plurality of supplemental servers via said load balancer.

20. A method, comprising the steps of:
   a) hosting a website on a first server;
   b) monitoring a website usage parameter;
   c) transferring said website to an overflow server when said website usage parameter exceeds a first predetermined value; and
   d) redirecting a plurality of traffic to said overflow server.

21. The method of claim 20, wherein said transferring step c) further comprises the steps of:
   i) generating a copy of said website;
   ii) installing said copy on said overflow server; and
   iii) deleting said website from said first server.

22. The method of claim 21, further comprising the steps of:
   e) monitoring said website usage parameter;
   f) transferring said website back to said first server when said website usage parameter falls below a second predetermined value; and
   g) redirecting said plurality of traffic to said first server.

23. The method of claim 20, wherein said transferring step c) further comprises the steps of:
   i) generating a copy of said website;
   ii) installing said copy on said overflow server; and
   iii) retaining said website on said first server.

24. The method of claim 20, further comprising the steps of:
   e) monitoring said website usage parameter; and
   f) redirecting said plurality of traffic to said first server when said website usage parameter falls below a second predetermined value.

25. The method of claim 20, wherein said website usage parameter is monitored by measuring website hits, central processing unit cycles, bandwidth utilization, disk utilization, number of connections, and/or any combination thereof.

26. The method of claim 20, wherein said overflow server comprises a clustered hosting solution.

27. The method of claim 26, wherein said clustered hosting solution comprises:
   i) a load balancer communicatively coupled to a network;
   ii) a plurality of supplemental servers communicatively coupled to said load balancer; and
   iii) a data server communicatively coupled to said plurality of supplemental servers.

28. The method of claim 27, wherein said transferring step c) further comprises transferring said website to said data server when said website usage parameter exceeds said first predetermined value.

29. The method of claim 28, wherein said redirecting step d) further comprises redirecting said plurality of traffic to said plurality of supplemental servers via said load balancer.

30. The method of claim 20, further comprising the steps of, prior to step a):
   i) offering for purchase a hosting overage protection service via a hosting provider's website; and
   ii) if said hosting overage protection service is purchased by a customer, proceeding to step a).

31. The method of claim 20, wherein said transferring step c) comprises automatically transferring said website to an overflow server when said website usage parameter exceeds a first predetermined value.

32. The method of claim 20, wherein said redirecting step d) comprises automatically redirecting a plurality of traffic to said overflow server.

33. The method of claim 31, wherein said transferring step c) further comprises the steps of:
   i) automatically generating a copy of said website;
   ii) automatically installing said copy on said overflow server; and
   iii) automatically deleting said website from said first server.

34. The method of claim 21, further comprising the steps of:
   e) automatically monitoring said website usage parameter;
   f) automatically transferring said website back to said first server when said website usage parameter falls below a second predetermined value; and
   g) automatically redirecting said plurality of traffic to said first server.

35. A method, comprising the steps of:
   a) offering for purchase a hosting overage protection service via a hosting provider's website;
   b) if said hosting overage protection service is purchased by a customer, hosting a website on a first server;
   c) monitoring a website usage parameter by measuring bandwidth use;
   d) when said website usage parameter exceeds a first predetermined value automatically transferring said website to a clustered hosting solution comprising a data server and a plurality of supplemental servers communicatively coupled to said data server, by:
      i) generating a copy of said website;
      ii) installing said copy on said data server; and
      iii) deleting said website from said first server;
   d) redirecting a plurality of traffic to said plurality of supplemental servers;
   e) monitoring said website usage parameter by measuring bandwidth use;
   f) transferring said website back to said first server when said website usage parameter falls below a second predetermined value; and
   g) redirecting said plurality of traffic to said first server.

* * * * *